(12) United States Patent
Gschwend et al.

(10) Patent No.: US 10,865,127 B2
(45) Date of Patent: Dec. 15, 2020

(54) LIQUID SEPARATION DEVICE COMPRISING A METALLIC MESH WITH A HYDROPHOBIC POLYMER COATING

(71) Applicants: Philip M. Gschwend, Lexington, MA (US); Francesco Stellacci, Pully (CH); Roberto Bagatin, Novara (IT); Da Deng, Troy, MI (US); Daniel P. Prendergast, Cambridge, MA (US)

(72) Inventors: Philip M. Gschwend, Lexington, MA (US); Francesco Stellacci, Pully (CH); Roberto Bagatin, Novara (IT); Da Deng, Troy, MI (US); Daniel P. Prendergast, Cambridge, MA (US)

(73) Assignees: Massachusetts Institute of Technology, Cambridge, MA (US); ENI SPA, Rome (IT)

( * ) Notice: Subject to any disclaimer, the term of this patent is extended or adjusted under 35 U.S.C. 154(b) by 0 days.

(21) Appl. No.: 14/433,554

(22) PCT Filed: Oct. 3, 2013

(86) PCT No.: PCT/US2013/063280
§ 371 (c)(1),
(2) Date: Apr. 3, 2015

(87) PCT Pub. No.: WO2014/055770
PCT Pub. Date: Apr. 10, 2014

(65) Prior Publication Data
US 2015/0203371 A1    Jul. 23, 2015

Related U.S. Application Data

(60) Provisional application No. 61/709,304, filed on Oct. 3, 2012.

(51) Int. Cl.
*C02F 1/40* (2006.01)
*B01D 17/00* (2006.01)
(Continued)

(52) U.S. Cl.
CPC .............. *C02F 1/40* (2013.01); *B01D 17/045* (2013.01); *B01D 17/10* (2013.01);
(Continued)

(58) Field of Classification Search
CPC .... C02F 1/40; C02F 2103/08; C02F 2101/32; C02F 2101/30; B01D 29/03; B01D 29/01; B01D 29/0093
(Continued)

(56) References Cited

U.S. PATENT DOCUMENTS 2,979,400 A * 4/1961 Mouwen ............ B01D 39/2034
210/510.1
3,096,204 A * 7/1963 Spangler ................ B01D 17/10
210/483
(Continued)

FOREIGN PATENT DOCUMENTS

JP     2008110294      5/2008
KR   1020110097150   *  8/2011

OTHER PUBLICATIONS

Kim KR 1020110097150 (machine translation and original attached) (Year: 2011).*

(Continued)

*Primary Examiner* — Liam Royce
(74) *Attorney, Agent, or Firm* — Steptoe & Johnson LLP

(57) ABSTRACT

A device for separating liquids such as oil and water includes a hydrophobic and oleophilic mesh that allows oil to pass through while preventing water from passing through. The
(Continued)

mesh can be fabricated simply from inexpensive materials by coating a mesh with a hydrophobic polymer.

6 Claims, 27 Drawing Sheets

(51) Int. Cl.
  *B01D 17/04* (2006.01)
  *B01D 29/00* (2006.01)
  *B01D 29/03* (2006.01)
  *C02F 101/32* (2006.01)
  *C02F 103/08* (2006.01)
(52) U.S. Cl.
  CPC ......... *B01D 29/0093* (2013.01); *B01D 29/03* (2013.01); *C02F 2101/32* (2013.01); *C02F 2103/08* (2013.01)
(58) Field of Classification Search
  USPC .................................................. 210/799, 767
  See application file for complete search history.

(56) References Cited

U.S. PATENT DOCUMENTS

| | | | | |
|---|---|---|---|---|
| 5,116,650 | A * | 5/1992 | Bowser ........................ | 428/34.2 |
| 5,137,633 | A * | 8/1992 | Wang .................. | B01D 39/1623 |
| | | | | 210/490 |
| 2008/0105629 | A1* | 5/2008 | Yang et al. .................... | 210/799 |
| 2009/0134094 | A1* | 5/2009 | Falkiner et al. .............. | 210/708 |
| 2010/0012586 | A1* | 1/2010 | Angelescu ............. | B01D 61/18 |
| | | | | 210/637 |
| 2010/0096317 | A1* | 4/2010 | Morita ................. | B01D 63/081 |
| | | | | 210/321.84 |
| 2012/0000853 | A1* | 1/2012 | Tuteja et al. ................. | 210/650 |
| 2014/0332462 | A1* | 11/2014 | Solomon ................ | B01D 71/68 |
| | | | | 210/500.33 |

OTHER PUBLICATIONS

What is capillary action and how is it affected by gravity? Ariel & Michal https://davidson.weizmann.ac.il/en/online/askexpert/chemistry/what-capillary-action-and-how-it-affected-gravity-ariel-michal (Year: 2012).*

Lin Feng et al., "A Super-Hydrophobic and Super-Oleophilic Coating Mesh Film for the Separation of oil and Water", *Angewandte Chemie International Edition*, vol. 43, No. 15, (Apr. 2, 2004) pp. 2012-2014.

International Search Report and Written Opinion from PCT/US2013/63280 dated Feb. 4, 2014.

* cited by examiner

LIQUID SEPARATION DEVICE COMPRISING A METALLIC MESH WITH A HYDROPHOBIC POLYMER COATING

CLAIM OF PRIORITY

This application claims the benefit of prior under 35 USC 371 to International Application No. PCT/US2013/063280, filed Oct. 3, 2013, which claims priority to U.S. Provisional Application No 61/709,304, filed Oct. 3, 2012, each of which is incorporated by reference in its entirety.

TECHNICAL FIELD

The present invention relates to a liquid separation device.

BACKGROUND

Widespread use of petrochemicals often leads to accidental releases in aquatic environments, occasionally with disastrous results. An extreme example is the 2010 Deepwater Horizon incident in the Gulf of Mexico which released an estimated 4.1 million barrels of crude oil from a platform approximately 66 km off the Louisiana shore. The cost of the oil spill, including the damage to the coastal ecosystem and the loss of an entire fishing and tourism season, is still being tabulated. The failure to prevent crude oil from reaching sensitive areas increased damages, and highlighted the need for new technological approaches to oil spill remediation.

The current technologies for handling oil spills include the use of skimmers, booms, in situ burning, sorbents, dispersants, and biodegradation. These approaches vary in expense and effectiveness, and are focused on cleanup; only skimming and some sorbents are designed to recover the spilled oil. Mechanically driven skimmers utilize differences in density or wettability to separate the oil and water, but can only recover oil near the deployment vessel. Sorbents can be spread over a large area, but have a finite capacity (polypropylene foams, the most common, absorb about 10 grams of oil per gram of sorbent) and must be collected after deployment. Safely handling the oil-soaked sorbent waste is challenging, as is recovering the absorbed oil.

SUMMARY

A hydrophobic and oleophilic mesh can separate oil from water or an aqueous solution continuously in situ via capillary action, providing a means of recovering spilt oil from surface waters. The mesh can be fabricated simply from inexpensive materials. Devices including the mesh can recover oil from an oil and water mixture (e.g., oil floating on water) at a rapid rate; can continuously separate oil and water without energy input; and can be durable and reusable.

In one aspect, a liquid separating device includes a porous element having a coating including a hydrophobic polymer.

The porous element can include a mesh. The mesh can be a metallic mesh. The metallic mesh can be a stainless steel mesh. The coating can include a polyolefin; for example, the coating can include a polyethylene.

The opening size of the uncoated mesh can be in the range of about 1 micrometer to about 2,000 micrometers. The coated mesh can have a water contact angle greater than about 100°. The coated mesh can have a water contact angle in the range of about 100° to about 150°. The coated mesh can have a water breakthrough depth of 10 cm or greater.

In another aspect, a liquid separating device includes an oil recovery chamber having an inlet including a porous element having a coating including a hydrophobic polymer; and an outlet configured to remove oil from the oil recovery chamber.

In another aspect, a method of separating an oil from water includes providing a liquid separating device including an oil recovery chamber having an inlet including a porous element having a coating including a hydrophobic polymer; and an outlet configured to remove oil from the oil recovery chamber; and supplying a composition including an oil and water to the inlet.

The porous element can include a mesh. The mesh can be a metallic mesh. The mesh can be a stainless steel mesh. The coating can include a polyolefin; for example, the coating can include a polyethylene.

The opening size of the uncoated mesh can be in the range of about 1 micrometer to about 2,000 micrometers. The coated mesh can have a water contact angle greater than about 100°. The coated mesh can have a water contact angle in the range of about 100° to about 150°. The coated mesh can have a water breakthrough depth of 10 cm or greater.

In another aspect, a method of making a liquid separating device includes contacting a porous element with a composition including a solvent and a hydrophobic polymer; and removing the solvent.

Removing the solvent can include evaporation of the solvent. Contacting can include immersing the porous element in the composition.

Other aspects, embodiments, and features will be apparent from the following description, the drawings, and the claims.

BRIEF DESCRIPTION OF THE DRAWINGS

FIGS. 21A-22B are graphs showing empirically derived relationship between the Keulegan-Carpenter (KC) number and the coefficients of drag ($C_d$) and inertia ($C_i$).

FIGS. 22A-22B are a graph and images showing diesel fuel layer thickness as a function of wave generator frequency.

DETAILED DESCRIPTION

Figure 1A:
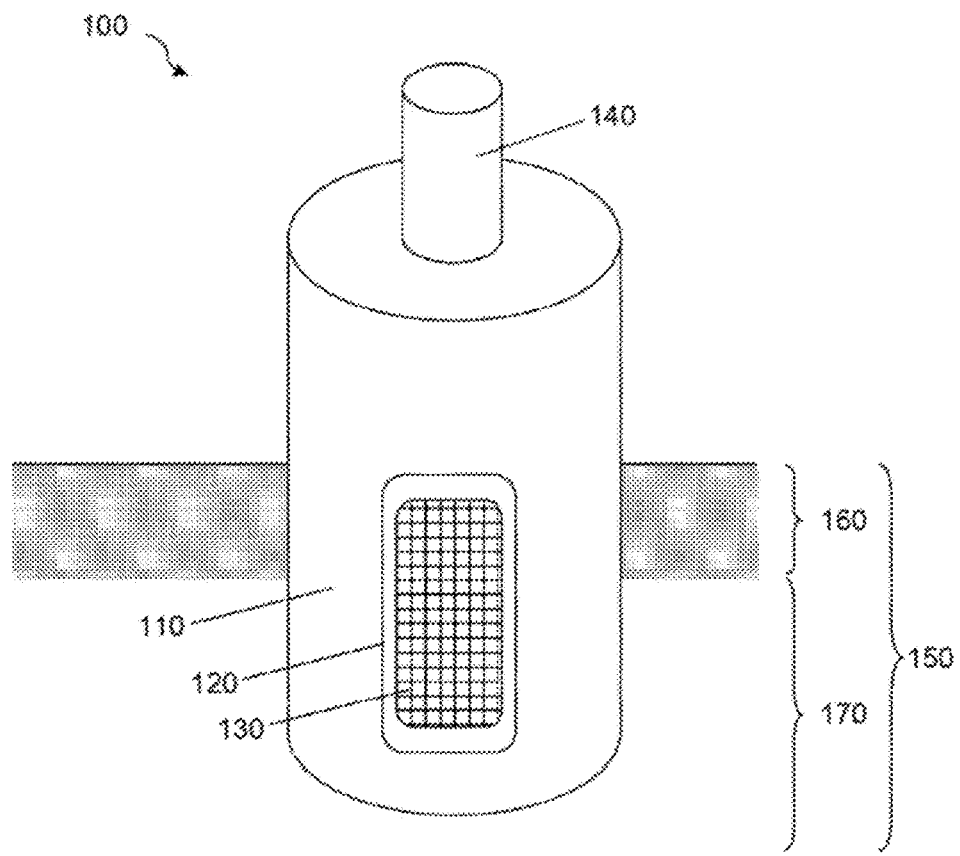
FIGS. 1A and 1B are schematic depictions of a system for separating oil and water.

An emerging approach to oil-water separations is the use of inexpensive, durable substrates with selectively wetting surfaces. In 2004, Feng et al. coated a stainless steel mesh by spraying it with a polytetrafluoroethylene (PTFE) emulsion. The PTFE coated mesh resisted wetting by water, but was completely wetted by nonpolar, low surface energy oils, making it superhydrophobic (water contact angle >150°) and oleophilic. A falling oil droplet was observed to rapidly pass through the mesh, which led to the conclusion that separation of oil and water using a selectively wetting mesh was feasible. See Feng, L., et al.; Angew. Chem., Int. Ed. 2004, 43, 2012-2014, which is incorporated by reference in its entirety. Numerous separations have since been performed using metallic meshes whose surfaces have been functionalized to be hydrophobic and oleophilic. Fabrication methods include electrospinning or airbrushing polymer coatings, inducing the growth of carbon nanotubes, chemical etching, growing fluorinated zinc oxide crystals, and self-assembly of long-chain fatty acids. See, for example, Tu, C; et al. Macromol. Rapid Comm. 2007, 28, 2262-2266; Wu, J.; et al. J. Chem. Technol. Biotechnol. 2012, 87, 427-430; Lee, C; Baik, S. Carbon 2010, 48, 2192-2197; Lee, C.; et al. Carbon 2011, 49, 669-676; Li, M.; Xu, J., Lu, Q. J. Mater. Chem, 2007, 17, 4772-4776; Wang, C; et al. ACS Appl. Mater. Interfaces 2009, 11, 2613-2617; Pan, Q.; et al. Appl. Surf. Sci. 2008, 254, 6002-6006; and Wang, S.; Song, Y.; Jiang, L. Nanotechnology 2007, 18, 015103; each of which is incorporated by reference in its entirety.

Additionally, hydrophilic/oleophobic meshes can separate oil from water or an aqueous solution by allowing the passage of water while preventing the flow of oil; such surfaces have been created by photoinitiated polymerization of hydrogel coatings (see Xue, Z.; et al. Adv. Mater. 2011, 23, 4270-4273, which is incorporated by reference in its entirety) and spray coating nanoparticle-polymer suspensions (see Yang, J.; et al. J. Mater. Chem. 2012, 22, 2834-2837, which is incorporated by reference in its entirety). This technique of functionalizing surfaces has also been extended to sorbents, as in coating) a paper-like nanowire substrate with polydimethyl siloxane (PDMS) (see Yuan, J.; et al. Nat. Nanotechnol. 2008, 3, 332-336). Unfortunately, none of the above methods create a surface that is clearly both durable and economic to produce.

The terms "water" and "aqueous solution," as used herein, are used interchangeably and include both pure water and aqueous solutions. Thus the terms "water" and "aqueous solution" contemplate water-based liquids that can include one or more dissolved solutes such as salts, small molecules, other liquids, and the like. The terms "water" and "aqueous solution," can also refer to liquids that additionally include suspended solids. The terms "water" and "aqueous solution" include naturally occurring waters, e.g., ocean water, river water, lake water, and so on.

The term "oil" refers to a nonaqueous phase that is sparingly soluble or substantially insoluble in water. Typically, but not necessarily, an oil is liquid at room temperature. An oil can be a pure compound or a mixture of compounds, and can be synthetic or naturally occurring (e.g., a plant oil or crude oil). An oil is sufficiently immiscible with water such that a mixture of the two, if allowed to settle, will separate, with the less dense liquid rising to the top and the denser liquid sinking to the bottom.

In general, a device for separating liquids, such as oil from water, can include a filter element, e.g., a porous element which selectively allows one liquid to pass through while excluding the other. Referring to FIG. 1A. liquid separation device 100 includes recovery chamber 110. Recovery chamber 110 includes inlet 120, which includes filter element 130. A mixed liquid 150 external to device 100 is brought into contact with the filter element 130 of inlet 120, e.g., by submerging at least the portion of recovery chamber 110 including the inlet 120. Mixed liquid 150 includes first liquid 160 and second liquid 170. Filter element 130 is substantially permeable to first liquid 160, but substantially impermeable to second liquid 170. Thus first liquid 160 can pass through filter element 130 to the interior of recovery chamber 110. Liquid in the interior of recovery chamber 110 can be removed from recovery chamber 110 via outlet 140.

The porous element can take the form of a mesh, sheet, film, woven or spun material, block, or other configuration.

In particular, a hydrophobic, superhydrophobic, oleophilic, or superoleophilic porous element can effectively separate an oil from water, by allowing oil to pass through while excluding water. The porous element can display a combination of these properties, e.g., being both superhydrophobic and oleophilic, or superhydrophobic and superoleophilic.

The porous element can have any configuration that provides suitably sized hydrophobic porosity. The porosity can be regular (e.g., in a repeating pattern, as in a mesh) or irregular. The porosity can be sized so as to provide capillary forces; for example, the pores can have diameters on the scale of about 100 nm to about 1 mm, or about 1 µm to about 100 µm. Hydrophobicity can be provided by the material that forms the porous element, or by a material applied to coat the porous element (or at least a portion of the porous element). For example, a non-hydrophobic material such as a metal can be coated with a hydrophobic polymer. Thus, in some cases, the underlying material of the porous element is chosen so as to be amenable to coating with a hydrophobic material, e.g., a hydrophobic polymer.

When the hydrophobicity is provided by a coating material, the pore size of the underlying porous element and coating thickness can be selected so that the porosity of the final, coated porous element is in the desired range. The porosity can also include roughness, i.e., features such as protrusions, indentations, or other deviations from a smooth surface. The roughness can occur across (he nanometer and micrometer scales; for example, micrometer-scale features can also be decorated with nanometer-scale features.

The porous element is desirably strong, i.e., resistant to ripping, tearing, or other mechanical failures. In particular, the porous element should be strong enough to support the weight of a hydrophobic coating, and strong enough to withstand the conditions found in use of the liquid separating device. In this regard, when the liquid separating device is to be used for removing spilled oil from natural waters, the porous element should be strong enough to withstand open water (e.g., immersion in a river, a lake, or the open ocean) for extended periods of time, e.g., days, preferably weeks, or more preferably months at a time.

The porous element can be made of any material(s) that provides these properties (porosity, hydrophobicity, strength), including but not limited to a metal, a polymer, a composite material, a synthetic fiber, a natural fiber, a porous ceramic, or the like. The coating can include a hydrophobic polymer, including but not limited to a polyolefin (e.g., a polyethylene, or a polypropylene) or a Ouorinated polymer (e.g., PTFE). In some cases, the coating consists essentially of the hydrophobic polymer.

The device can also include an inlet where the filter element is arranged. The filter element is positioned such that a liquid to be separated (e.g., an oil/water mixture) comes into contact with the filter element via the inlet. The device also includes an oil recovery chamber, which is on the opposite side of the filter element from the liquid to be separated. As the filter element selectively allows oil to pass through, oil can collect in the oil separation chamber and thus be removed from the oil/water mixture. The oil can be removed from the oil recovery chamber via an outlet. The removal can be passive (e.g., by gravity flow, such as through a siphon), or active (e.g., with energy input, such as with a pump to remove the oil). Removal of oil from the oil recovery chamber can facilitate further separation of oil from the oil/water mixture. Continuous removal of oil from the oil recovery chamber can facilitate continuous separation of the oil/water mixture.

At the surface of a liquid is an interface between that liquid and some other medium. How the liquid and the medium interact depends in part on the properties of the liquid, including surface tension. Surface tension is not a property of the liquid alone, but a property of the liquid's interface with another medium. Where three phases meet, they form a contact angle, $\theta$, which is the angle that the tangent to the liquid surface makes with the solid surface. A droplet resting on a flat solid surface and surrounded by a gas forms a characteristic contact angle $\theta$. If the solid surface is rough, and the liquid is in intimate contact with the rugged or featured surface, the droplet is said to be in the Wenzel state. If instead the liquid rests on the tops of the features or rugged surface, it is said to be in the Cassie-Baxter state.

Wenzel determined that when the liquid is in intimate contact with a microstructured surface, $\theta$ will change to $\theta_{w*}$.

$$\cos \theta_{w*} = r \cos \theta$$

where r is the ratio of the actual area to the projected area. Wenzel's equation shows that a microstructured surface amplifies the natural tendency of a comparable featureless surface. A hydrophobic surface (one that has an original contact angle greater than 90°) becomes more hydrophobic when microstructured. In other words, its new contact angle becomes greater than the original. However, a hydrophilic surface (one that has an original contact angle less than 90°) becomes more hydrophilic when microstructured. Its new contact angle becomes smaller than the original.

Cassie and Baxter found that if the liquid is suspended on the tops of microstructures, $\theta$ will change to $\theta_{CB*}$:

$$\cos \theta_{CB*} = \varphi(\cos \theta + 1) - 1$$

where $\varphi$ is the area fraction of the solid that touches the liquid.

A smooth surface can be hydrophobic based on the surface chemistry of the material forming the surface alone. A highly porous and/or rough surface of the same material will have increased hydrophobicity. The apparent contact angle on a rough surface that consists of two substances (in this case, a coating material and air within the mesh openings) can be found by combining the Wenzel and Cassie-Baxter equations into $$\cos \theta^* = f r_f \cos \theta + f - 1$$

where $\theta^*$ is the apparent water contact angle of the composite surface, f is the area fraction of the projection of the coating material in contact with the liquid, $r_f$ is the roughness ratio of the part of the coating material surface that is wet by the liquid (ratio of actual surface area to apparent surface area), and $\theta$ is the contact angle of water on a smooth surface of the coating material. Note that for a hydrophobic, surface ($\theta > 90°$), increasing the roughness ratio increases the apparent contact angle, while the opposite is true for hydrophilic surfaces. In addition, for either type of surface, decreasing the fraction of solid in contact with the liquid will increase the apparent contact angle, as the contact angle of any liquid with air is assumed to be 180°. See, e.g., Wenzel, R. N. *Ind. Eng. Chem.* 1936, 28, 988-994; and Cassie, A. B. D.; Baxter, S.; *Trans. Faraday Soc.* 1944, 40, 546-551; each of which is incorporated by reference in its entirety. This fraction of air affects the value of f through both the openings in the mesh, and any partial wetting of the polyethylene surface resulting from submicron structures.

A hydrophilic surface is one that has a water contact angle between 5° and 90°; a superhydrophilic surface has a water contact angle <5°. A hydrophobic surface has a water contact angle from 90° to 150°; a superhydrophobic surface has a water contact angle of >150°. A oleophilic surface is one that has an oil contact angle between 5° and 90°; a superoleophilic surface has an oil contact angle <5°. An oleophobic surface has an oil contact angle from 90° to 150°; a superoleophobic surface has an oil contact angle of >150°.

A filter element suitable for use in a device for separating oil and water can be fabricated as follows by coating a porous element such as a mesh, e.g., a metallic mesh, with a composition including a hydrophobic polymer. Coating can include dissolving or dispersing the polymer in a suitable (e.g., hydrophobic) solvent, and applying the solution or dispersion to the mesh. Application can be by any method, including spraying the solution or dispersion on the mesh, or submerging the mesh in the solution or dispersion. The coating can be dried, for example, by allowing the solvent to evaporate. The drying conditions (e.g., temperature, partial pressure of the solvent, local air flow, or other conditions) can influence the surface properties of the coaling. For example, a rapid evaporation of solvent can inhibit the formation of crystalline polymer, resulting in a coating having numerous amorphous domains of polymer. In this case, the presence of the amorphous domains can provide a rough surface; the roughness is related to the size of the amorphous domains. It can be advantageous to have a rough surface where the roughness occurs on the micrometer scale. It can be advantageous to have a rough surface where the roughness occurs on the nanometer scale. It can be advantageous to have a rough surface where the roughness occurs on both the micrometer and the nanometer scale.

The resulting coated mesh can be hydrophobic, superhydrophobic, oleophilic, superoleophiiic, or a combination of these. Prior to coating, the mesh can have an opening size in the range of 1 micrometer to 2,000 micrometers, e.g., 50 micrometers to 2,000 micrometers, 100 micrometers to 1,500 micrometers, or 200 micrometers to 1,000 micrometers. The opening size of a coated mesh is smaller than the opening size of the initial uncoated mesh.

The hydrophobicsty of the mesh can potentially be overcome if the water pressure exerted on the water-facing side of the mesh exceeds the hydrophobic forces opposing the passage of water through the mesh. If the mesh is submerged to a depth where the water pressure exceeds those hydrophobic forces; water will pass through the mesh ("breakthrough"). This is referred to as the breakthrough depth. When using a liquid separation device in a practical setting, efficient oil separation occurs when the mesh is not penetrated by water, i.e., when the mesh is not subjected to pressures sufficient to cause breakthrough. Accordingly, it can be advantageous to provide a mesh with a large breakthrough depth.

Disclosed herein is the successful fabrication of simple devices that: (1) recover oil floating on water at a rapid rate, (2) continuously separate oil and water without energy input, (3) are durable and reusable, and (4) are inexpensive to produce. Stainless steel meshes were dip-coated in xylene solutions of low-density polyethylene, giving them a hydrophobic and oleophilic surface while retaining the excellent mechanical properties of the underlying steel. Rough polyethylene surface was successfully coated on stainless steel meshes in a manner in which the thickness of polyethylene coating, and thus the size of the openings, could be tuned. The meshes were characterized by pore size and static contact angle, and they were integrated into a collection apparatus that successfully separated oil and water. In contrast to typical oil recovery techniques, disclosed devices separate continuously via capillary action; oil only needs to be pumped away from the inside to perpetuate the process.

Furthermore, this work quantifies the effects of coating roughness, pore size, and oil viscosity on the oil recovery rate and examines the water breakthrough pressures. Decreasing pore size was found to improve the water intrusion depth, but decreased the rate of oil recovery, indicating the existence of an optimal opening size for given field conditions and performance requirements. An expression was developed that accurately predicted the depth at which water intrusion occurred; and taken together with the disclosed approach for anticipating the oil uptake rate, one can envision optimizing mesh sizes and coating thicknesses to achieve recovery of spilled oil.

EXAMPLES

Materials and Methods

Materials. All materials were used as received. Low-density polyethylene (LDPE) was obtained as pellets from Aldrich and had a melt flow index of 2.8 g·min$^{-1}$ at 190°. Woven stainless steel (304) meshes were obtained from McMaster-Carr with three opening sizes: 100 µm, 220 µm, and 1500 µm. All meshes were cleaned three times in an ultrasonic bath with a 50:50 ethanol:water solution for 5 min before use. ACS reagent-grade mixed-isomer xylenes were obtained from Sigma-Aldrich. Southern Louisiana crude oil was obtained from John Harrington of the Woods Hole Oceanographic Institute, while the other oils (castor, olive, and canola) were obtained from grocery stores. This set of oils reflects a broad range of viscosities encompassing those found for many crude oils (Table 1). The oil viscosities were measured in accordance with ASTM D-1545, and the surface tensions were measured using the capillary rise technique. Seawater was collected from the Port of Christopher Columbus Waterfront Park in Boston, Mass.

TABLE 1

Physical properties of oils tested with bench-top oil-water separation device.

| Sample | Surface Tension$^a$ (dyne/cm) | Viscosity$^a$ (cP) |
| --- | --- | --- |
| Canola Oil | 30.9 ± 0.7 | 73 ± 9 |
| Olive Oil | 30.2 ± 0.9 | 75 ± 9 |
| Castor Oil | 31.0 ± 0.7 | 780 ± 13 |
| Southern Louisiana Crude Oil | 28.8 ± 0.6 | 64 ± 9 |

$^a$Measured at the experimental temperatures: 23 ± 1° C.

Polyethylene-Coated Mesh Preparation. First, the desired mass of polyethylene was dissolved in the mixed-isomer xylenes at 110° C. while stirring. Concentrations of polyethylene in xylene used in these experiments were limited to 15 mg·mL$^{-1}$, 30 mg·mL$^{-1}$, and 60 mg·mL$^{-1}$. Then, a sample of the woven stainless steel mesh was soaked in the dissolved polyethylene solution for 30 min to enable adhering air bubbles to escape. Subsequently, the mesh was removed fully wetted, kept in a horizontal position, and air-dried in a fume hood at room temperature on a wire scaffold. After air-drying for 30 min, the coated mesh was heated in a ventilated oven at 70° C. overnight.

Characterization of Meshes Using Optical Microscopy. Physical dimensions of the coated and uncoated meshes were measured using an inverted optical microscope (TE2000; Nikon). First, the areas of a large sampling of openings for each mesh-coating combination were measured and the mean area was calculated. Then, this mean area was used to calculate an effective pore radius r of a circle with equivalent area. The corresponding effective coated wire radius R was calculated by halving the width of an uncoated mesh opening, subtracting the effective pore radius, and adding the radius of the uncoated wire. An exception was made for meshes coated with a 15 mg·mL$^{-1}$ polyethylene-xylene solution, since using this method would result in an effective coated wire radius smaller than the radius of an uncoated wire. In drat case, the coated wire radius R was measured directly. A summary of these coated-mesh properties can be found in Table 2.

Contact Angle Measurements. Water contact angle measurements were made using 10 µL drops of distilled water at three different spots on each sample. Drop images were captured using a digital SLR camera (EOS Rebel XSi; Canon) fitted with a macro lens (EF 50 mm f/2.5 Compact Macro). The contact angle was determined from image data using software as described in Stalder, A. F.; et al. *Colloids Surf., A* 2010, 364, 72-81, which is incorporated by reference in its entirety. The software uses a low-bond axisymmetric drop shape analysis (LBADSA) technique to fit the axisymmetric Young-Laplace equation to the shape of the drop. All measurements were taken three times, and reproducible to less than ±3°.

AFM Roughness Measurements. The roughness of a 10 µm by 10 µm area of the coated meshes was determined by probing the surface topography using an atomic force microscope (D3100, Nanoscope IIIa controller; Veeco/Digital Instrument, Santa Barbara, Calif., USA). Due to the inherent curvature of the woven wire substrate, and the large size of the LDPE surface microstructures (commonly greater than 5 µm), the roughness ratio (ratio of the actual surface area to the projected surface area) could only be calculated for the most raised portion of the wires, which were relatively uncoated compared to the remainder of the mesh.

at 20° C./mm; (5) Isothermal hold at 50° C. for 1 mm; (6) Cool to 50° C. at 20° C./min. Reported values are calculated after subtracting a background uncoated mesh sample.

Breakthrough Pressure of Water. The depth at which the hydrostatic water pressure overcomes the capillary pressure within (he mesh openings is the maximum operation depth for a given mesh. To test this, a sample of each mesh size was coated in a 60 mg·mL$^{-1}$ polyethylene-xylene solution as described above. Then, each mesh was affixed to the end of a glass tube using adhesive and slowly lowered vertically into a clear tank of water. The shallowest depth at which water percolation occurred was recorded, while taking care to ensure that it did not originate from leaks around the adhesive seal.

Figure 1B:
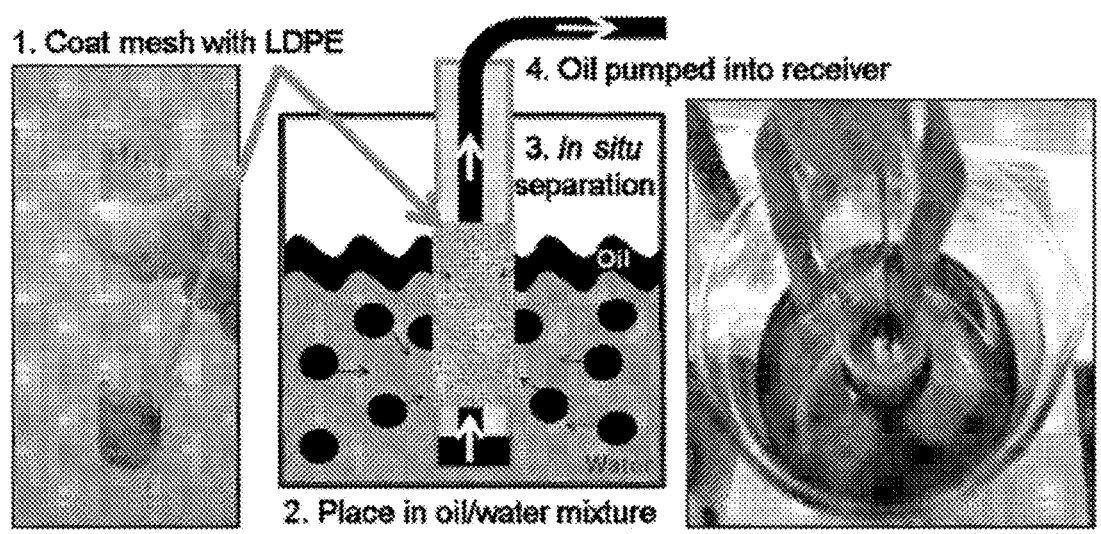

Oil Spill Recovery. Experimental testing was performed in order to quantitatively assess the ability of the mesh to continuously recover four different types of oils (canola, olive, castor and Southern Louisiana crude oil) from atop a pool of water. The mesh was mounted on the sides of a glass test tube (1" OD) so as to cover "windows" cut in the side of the tube. The test tube was then immersed in a beaker with 400 mL of distilled water beneath a 25 mL layer of oil (0.5 cm thick) such that the mesh window was in contact with the oil layer (FIG. 1B). The oil immediately flowed through the mesh windows and pooled at the bottom of the test tube from which it was continuously pumped and collected in a separate graduated cylinder. The recovered volume was noted as a function of time. The first series of recovery experiments used the same 220 µm swatch of mesh coated in 60 mg·mL$^{-1}$ solution of LDPE-xylene while varying the oil. The mesh was rinsed with dichloromethane and air-dried between experiments. The second series of experiments used seawater and a single oil, Southern Louisiana crude,

TABLE 2

Dimensions of coated and uncoated meshes

| Approximate Uncoated Mesh Opening Size (µm) | Coating Concentration (mg/mL) | Mean Opening Area of Coated Mesh (µm$^2$) | Mean Effective Pore Radius (µm) | Effective Coated Wire Radius (µm) |
|---|---|---|---|---|
| 100 | Uncoated | 9030 ± 480 | 95.0 ± 4.2$^a$ | 58.3 ± 4.2$^b$ |
|  | 15 ± 1 | 7840 ± 510 | 50.0 ± 1.6 | 63.2 ± 4.2$^b$ |
|  | 30 ± 2 | 4600 ± 1100 | 38.2 ± 4.4 | 67 ± 11 |
|  | 60 ± 4 | 150 ± 160 | 6.9 ± 3.9 | 99 ± 10 |
| 220 | Uncoated | 35000 ± 1100 | 187 ± 4$^a$ | 128 ± 4$^b$ |
|  | 15 ± 1 | 33000 ± 780 | 103 ± 1 | 132 ± 4$^b$ |
|  | 30 ± 2 | 21700 ± 980 | 83.0 ± 1.9 | 139 ± 8 |
|  | 60 ± 4 | 9300 ± 1200 | 54.5 ± 3.4 | 167 ± 9 |
| 1500 | Uncoated | 910000 ± 14000 | 954 ± 4$^a$ | 185 ± 4$^b$ |
|  | 15 ± 1 | 908000 ± 14000 | 538 ± 4 | 188 ± 4$^b$ |
|  | 30 ± 2 | 726000 ± 13000 | 481 ± 4 | 206 ± 10 |
|  | 60 ± 4 | 459000 ± 10000 | 382 ± 4 | 280 ± 10 |

$^a$Actual opening width.
$^b$Actual wire radius.

SEM Images. The micro- and nano-scale morphology of the LDPE coating was revealed using a field emission scanning electron microscope (SEM, JEOL) operating at 15 kV. Before FESEM observations, the samples were coaled with gold to improve their surface conductivity by a gold sputter (EffaCoater) at 30 mA for 30 seconds in vacuum.

Crystallinity Measurements. The crystallinity of the LDPE coating was assessed using a power compensated differential scanning calorimeter (Diamond; Perkin Elmer) to measure the enthalpy of fusion. The temperature program consisted of: (1) Ramp from 50° C. to 80° C. at 20° C./min; (3) Isothermal hold for 1 mm at 80° C.; (4) Ramp to 150° C.

while varying the mesh size. Each mesh had been coated in a 60 mg·mL$^{-1}$ LDPE-xylene solution.

Determination of the Permeate Wafer Content. After each oil recovery experiment, an aliquot of oil permeate was immediately collected, sealed within a pre-weighed wide glass vial, and weighed again. The vial was later opened, sealed within a larger container containing anhydrous calcium sulfate, and kept at 60° C. for no less than 3 h. After cooling, the water content was determined gravimetrically from both the mass lost by the sample, and the mass gained by the desiccant. The detection limit for this method was determined to be 1% water by mass, based on error using external standards.

Results and Discussion

Figure 2:
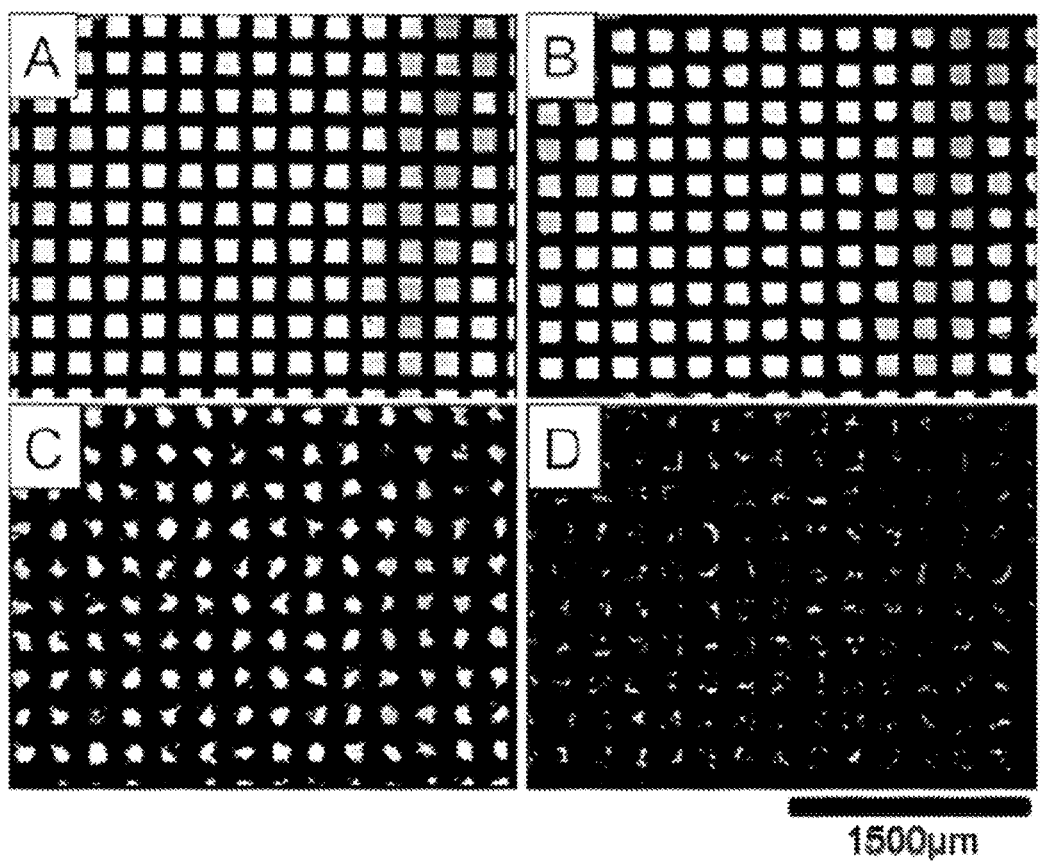
FIGS. 2A-2D are micrographs of a stainless steel mesh (uncoated opening size 100 μm) coated with varying amounts of polymer.
Figure 3:
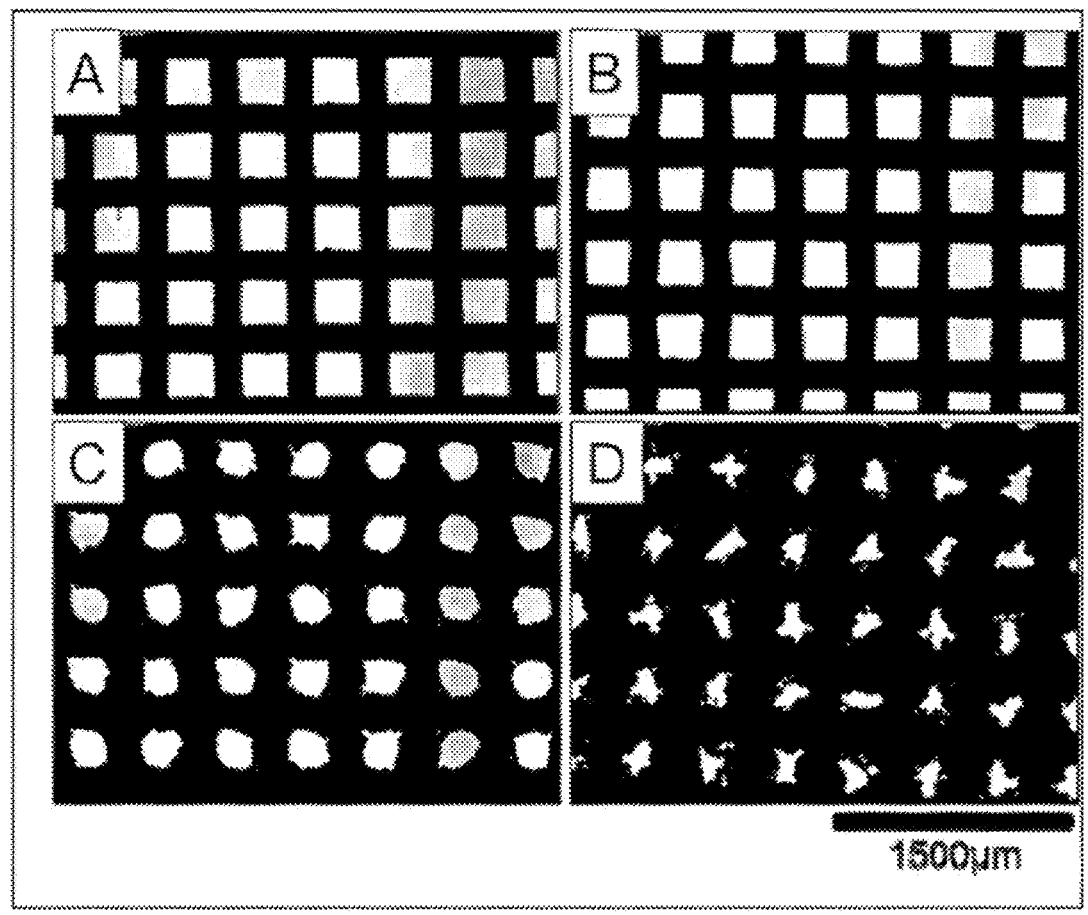
FIGS. 3A-3D are micrographs of a stainless steel mesh (uncoated opening size 220 μm) coated with varying amounts of polymer.
Figure 4:
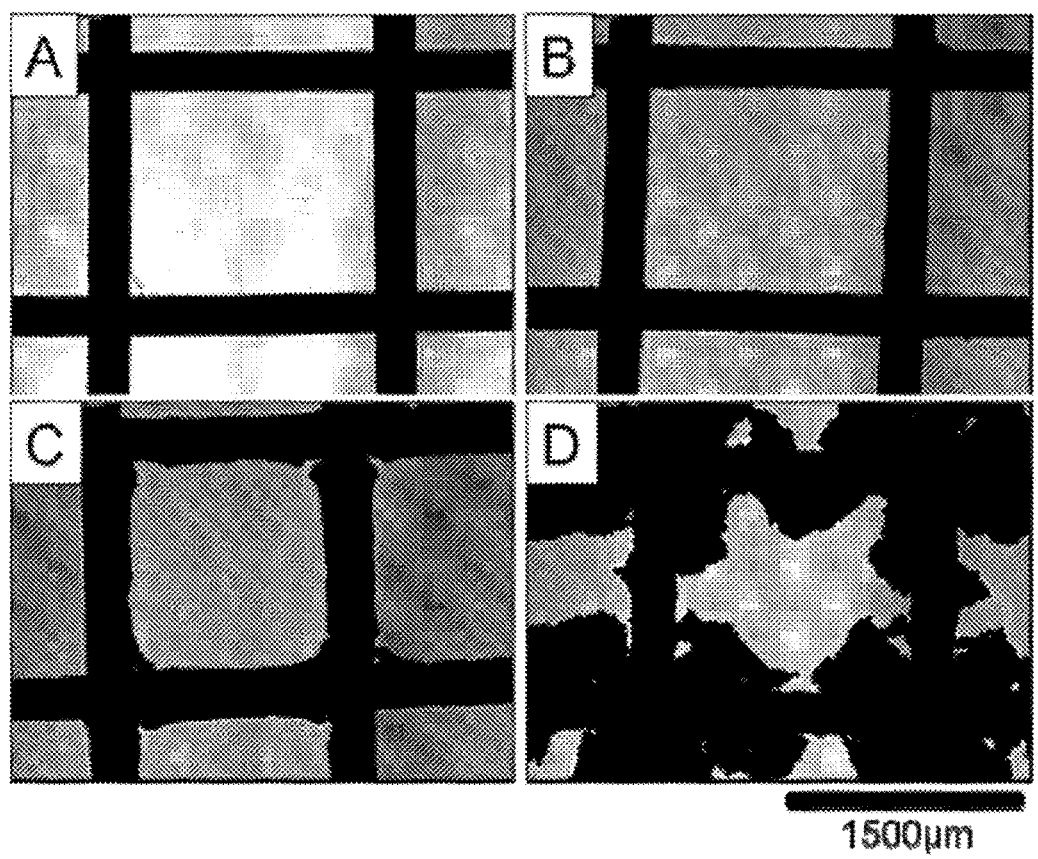
FIGS. 4A-4D are micrographs of a stainless steel mesh (uncoated opening size 1500 μm) coated with varying amounts of polymer.
Figure 10:
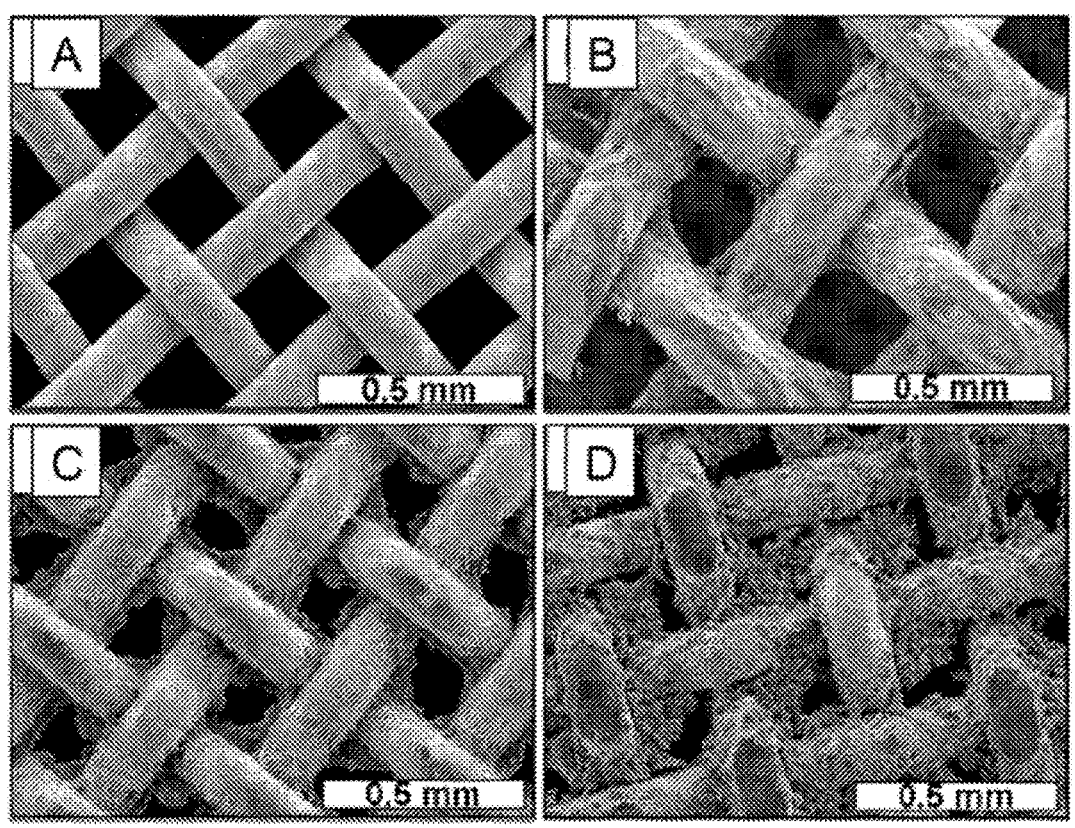
FIGS. 10A-10D are SEM micrographs of a stainless steel mesh (uncoated opening size 220 µm with varying amounts of polymer.
Figure 11:
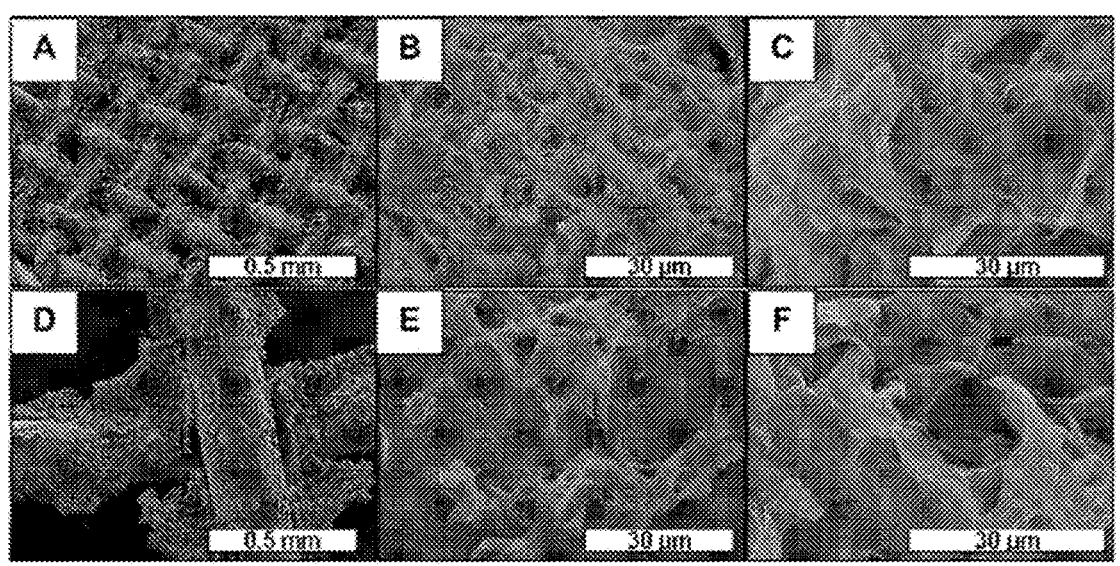
FIGS. 11A-11F are SEM micrographs of the 100 µm mesh (FIGS. 11A-11C) and the 1500 µm mesh (FIGS. 11D-11F) with a coating concentration of 60 mg/mL.

Properties of the Polyethylene Coatings on Stainless Steel Meshes. Coatings of polyethylene on stainless steel mesh were characterized by optical microscopy (FIGS. 2-4) and scanning electron microscopy (SEM) (FIGS. 10-11). FIGS. 10A-10D are SEM micrographs of various coating concentrations (mg polyethylene/mL xylene) on the 220 µm stainless steel mesh. The mesh was dipped into coating concentrations of uncoated mesh (FIG. 10A), 15 mg·mL$^{-1}$ (FIG. 10B), 30 mg·mL$^{-1}$ (FIG. 10C), and 60 mg·mL$^{-1}$ (FIG. 10D). FIGS. 11A-11F are SEM micrographs of the 100 µm mesh (FIGS. 11A-11C) and the 1500 µm mesh (FIGS. 11D-11F) with a coating concentration of 60 mg/mL.

An inverted optical microscope was used to characterize the size and shape of the openings within three mesh sizes (uncoated opening widths of 100 µm, 220 µm, and 1500 µm) coated in a polyethylene-xylene solution of three concentrations (15, 30, and 60 mg/mL). For all mesh sizes, as the coating concentration increased, the size of the openings decreased, and the openings grew more jagged and irregular. Based on SEM micrographs of the 220 µm mesh (FIG. 10), the jagged openings indicate a rougher coating of polyethylene.

The thickness of the polyethylene coating on the stainless steel mesh was easily controlled by adjusting the initial dissolved concentration of polyethylene in xylene. Compared to the wire diameter of a bare mesh (uncoated opening size 100 µm, FIGS. 2A and 10A), the coating from a 15 mg·mL$^{-1}$ polyethylene -xylene solution only increased the wire diameter by about 10% (FIGS. 2B and 10B). With a flaky coating, and tended to accrue in the narrower spaces within the weave. When the concentration was increased to 30 mg·mL$^{-1}$, a significant increase in the amount of polyethylene coated on the mesh was seen observed (FIGS. 2C and 10C). The SEM image indicates that the polyethylene forms a thin film in the interstitial opening of the mesh, coplanar with the mesh orientation. In addition, the wires become more thickly coated with a rougher surface, again favoring the confined portions of the weave. These microstructures became even more obvious when the highest concentration of 60 mg·mL$^{-1}$ was used (FIGS. 2D and 10D). The polyethylene-coated on the mesh almost filled the 220 µm grid space between wires with highly irregular formations, while the most raised portions of the wires remained only lightly coated.

Figure 12:
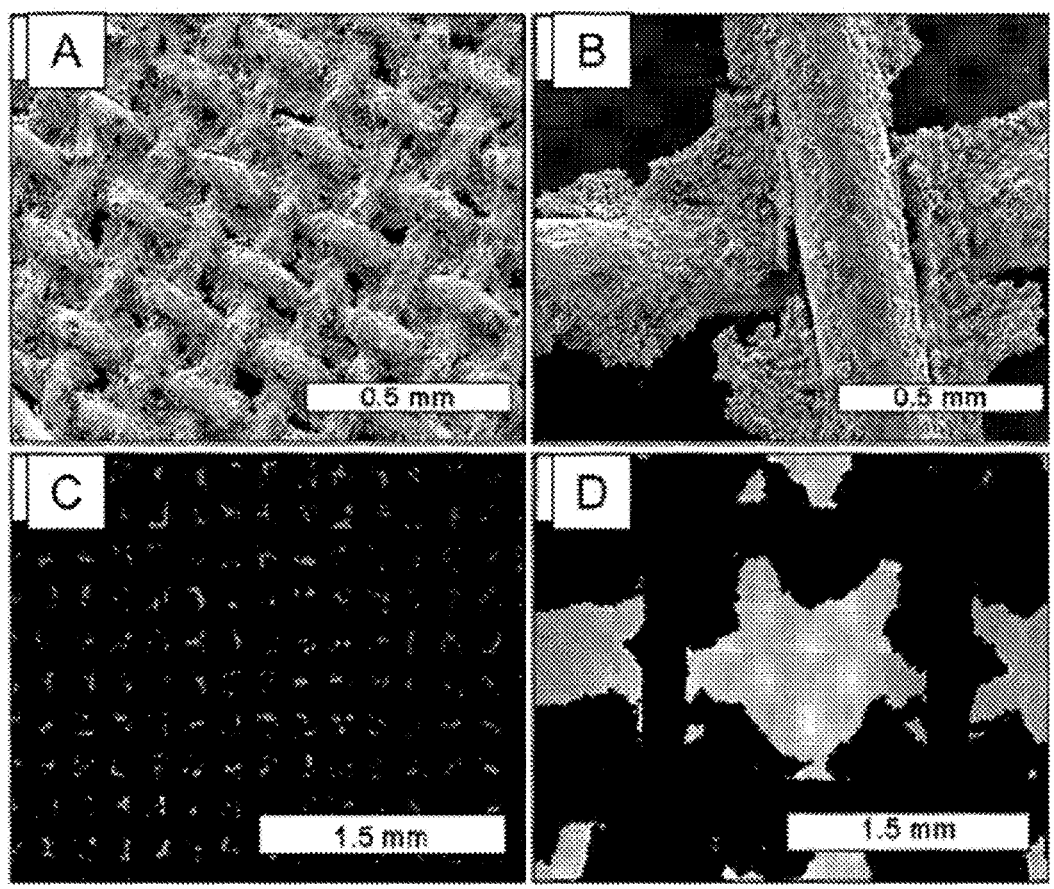
FIGS. 12A-12D are SEM micrographs of two additional mesh sizes coated in a 60 mg·mL$^{-1}$ solution, (a) SEM micrograph of a 100 µm mesh, (b) SEM micrograph of a 1500 µm mesh (c) Optical image of the same 100 µm mesh (d) Optical image of the same 1500 µm mesh.

The same method was used to coat steel meshes with larger and smaller openings (FIG. 12). The 100 µm mesh had a much more complete coaling, including most of the raised portions of the wires (FIG. 12A). The mesh openings were nearly completely closed off, with rough, fagged edges (FIG. 12C). In contrast, the larger 1500 µm mesh had most of the polyethylene concentrated in the comers or edges of the grid, creating "star-shaped" pores (FIGS. 12B and 12D). However, all meshes coated at this high concentration showcased similar surface morphologies, with microstructures particularly prominent on the interstitial polyethylene. Additional optical microscopy suggests that the polyethylene coating exhibits similar morphology For a given concentration, regardless of the size of the mesh opening.

When a 220 µm mesh (i.e., uncoated opening size 220 µm, FIG. 3A) was used, again it was noticed that only a minimal amount of polyethylene was coated when the concentration was 15 mg·mL$^{-1}$ (FIG. 3B and FIGS. 16A-16C). The grid openings were still mostly square in shape with a light amount of polyethylene attached at the comers. When the polyethylene concentration was increased to 30 mg·mL$^{-1}$, significantly more polyethylene was coated onto the mesh (FIG. 3C and FIGS. 16D-16F). The polyethylene coated on the wires made the surfaces rough and changed the square shaped grid into a nearly circle-shaped grid. However, when the concentration was doubled to 60 mg·mL$^{-1}$, the pores became less circle-like and more irregular (FIG. 3D and FIGS. 16G-16I), indicating a very rough coating. This general trend was repeated when a significantly larger grid size was used (1500 µm openings, FIGS. 4A-4D). In FIGS. 4A-4D, a 1500 µm mesh is shown bare (FIG. 4A), and coated with polyethylene from a xylene solution at 15 mg·mL$^{-1}$ polyethylene (FIG. 4B), 30 mg·mL$^{-1}$ polyethylene (FIG. 4C), or 60 mg·mL$^{-1}$ polyethylene (FIG. 4D). Despite the significantly larger mesh opening, the polyethylene was coated onto the mesh with similar morphologies as the smaller mesh sizes at a given coating concentration. At a concentration of 60 mg·mL$^{-1}$, the polyethylene formed on the mesh again clearly revealed its rough nature with "star-shaped" pores (FIG. 4D).

Figure 13A:
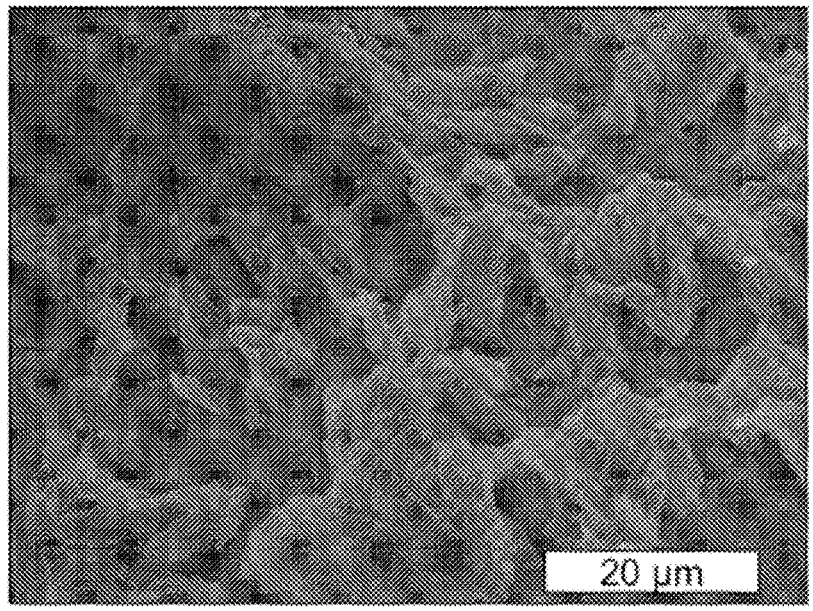
FIGS. 13A-13B are High magnification SEM micrographs of a 220 µm mesh coated with a 60 mg·mL$^{-1}$ LDPE-xylene solution. The LDPE coating exhibits both micro- and nano-scale structures.
Figure 13B:
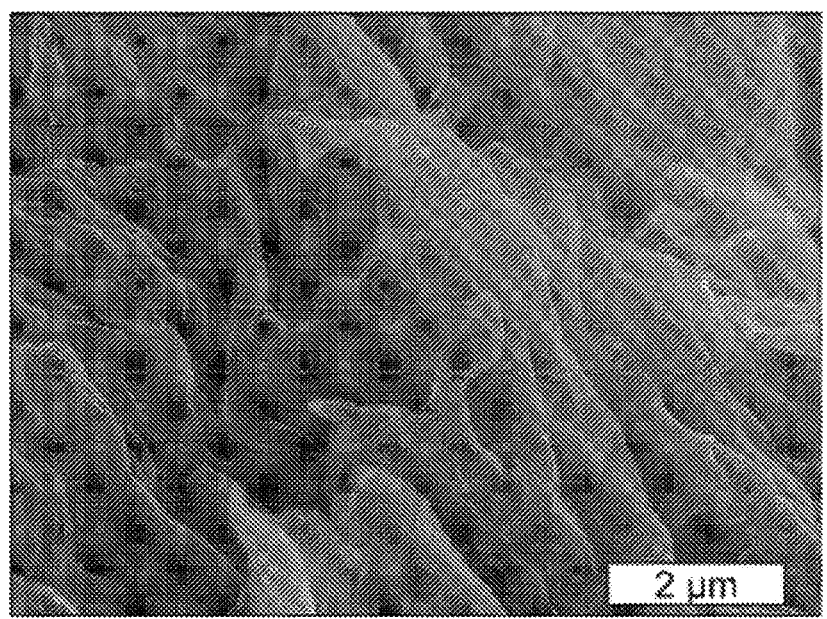

Surface Roughness and Liquid Contact Angles. At the higher concentrations (30 and 60 mg·mL$^{-1}$), the polyethylene-coated on the stainless steel mesh was visibly white in color, which is different from common, transparent solid polyethylene. This could be explained by a highly porous polyethylene coating, which would scatter light and cause the surface to appear white. Higher magnification SEM micrographs (FIG. 13) confirm this observation, indicating the presence of sub-micron structures in the polyethylene coating. DSC analysis of the 220 µm mesh coated with various concentrations indicated that the coated polyethylene is about 20% crystalline. In FIG. 13, the mass ratios of polyethylene to SS for the 15, 30, and 60 mg/mL coatings were 0.017, 0.0069, and 0.0037, respectively.

Figure 14:
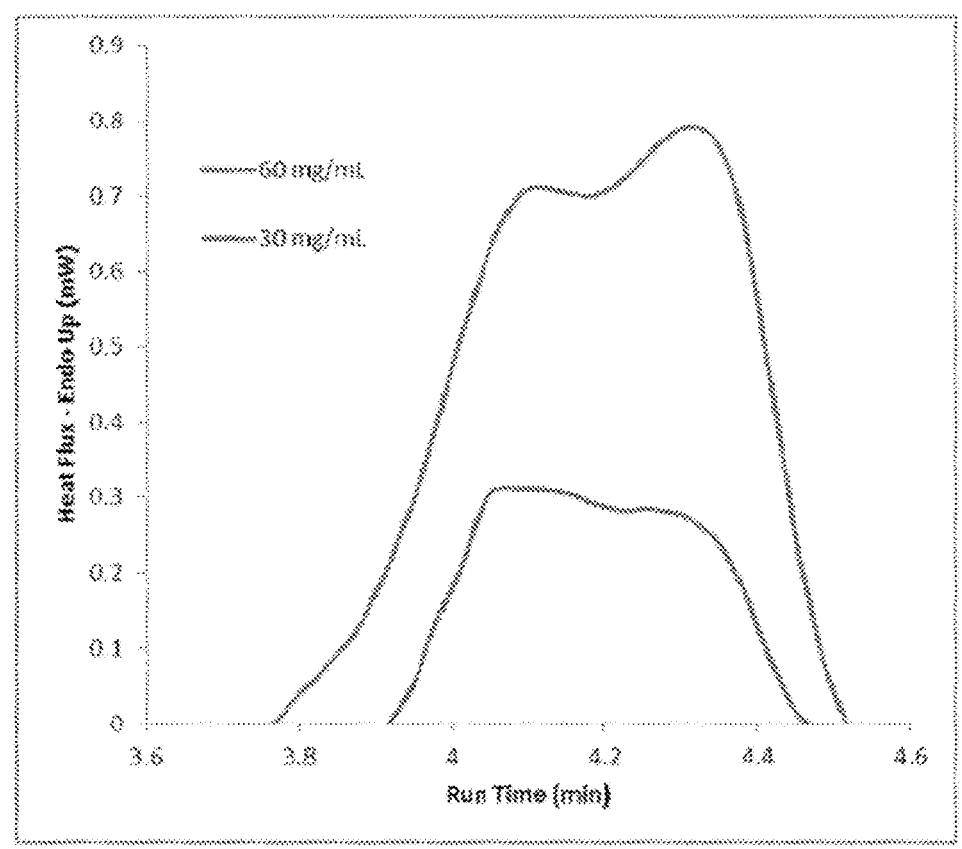
FIG. 14 is a graph showing baseline-subtracted melting peaks for the medium mesh with various coatings.

The results from the DSC analysis of three coating concentrations on a 220 µm mesh are tabulated below. The enthalpy of fusion of each sample was measured directly, with a value of 290 J/g used for fully crystalline polyethylene. The values in Table 3 are an average of three runs, with experimental errors reported. The masses measured were quite low, due to the low mass ratio of the polyethylene coating to the steel substrate. The two measured samples are mostly amorphous, and have approximately equal crystallinity. FIG. 14 contains the melting curves of the 30 and 60 mg/mL polyethylene coatings. No melting curve could be observed for the 15 mg/mL mesh due to the small sample mass.

TABLE 3

Crystallinity of coated 220 µm mesh.

| Coating Concentration (mg/mL) | Mass of polyethylene Tested (µg) | Enthalpy of Fusion (J/g) | % Crystallinity |
|---|---|---|---|
| 15 ± 1 | 85 ± 3 | BDL | N/A |
| 30 ± 2 | 130 ± 4 | 55 ± 6 | 19 ± 2% |
| 60 ± 4 | 344 ± 10 | 61 ± 7 | 21 ± 3% |

The temperature program used for each run was as follows:
1) Heat from 50.0° C. to 80.0° C. at 20.0° C./min
2) Hold for 1.0 min at 80.0° C.
3) Heat from 80.0° C. to 160.0° C. at 20.0° C./min
4) Hold for 1.0 min at 160.0° C.
5) Cool from 160.0° C. to 80.0° C. at 20.0° C./min Thus, the roughness may have been caused by evaporating the xylene quickly in the well ventilated fume hood, forming amorphous polyethylene with small channels for xylene evaporation. This fast evaporation created micro- and nano-structures that were visible at all concentrations.

Figure 15A:
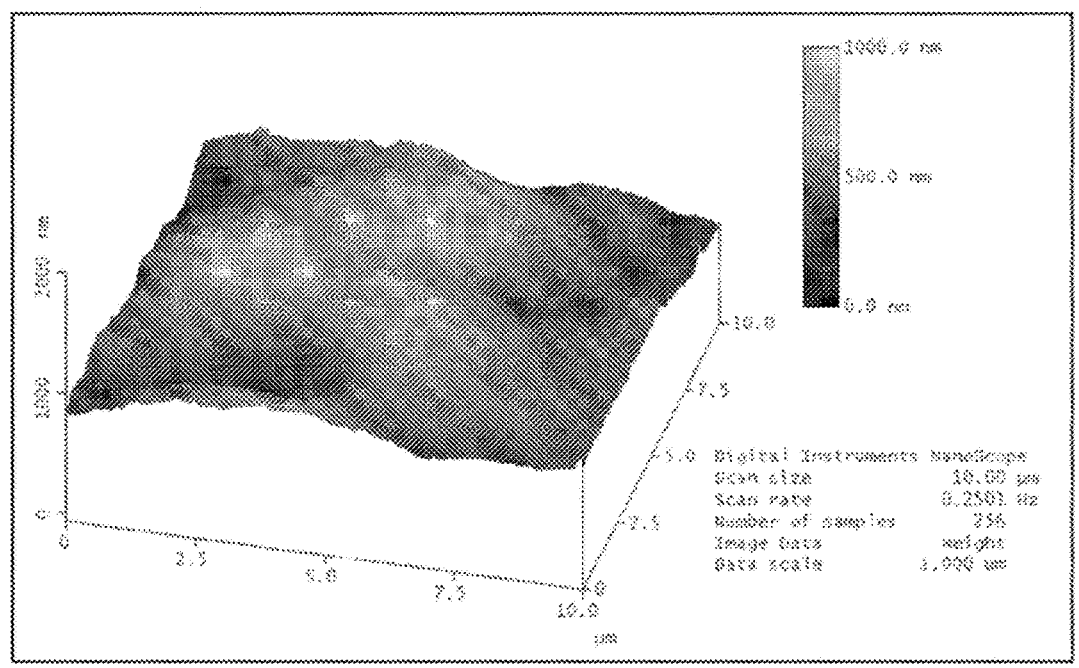
FIGS. 15A-15C show AFM surface plots in different conditions.
Figure 15B:
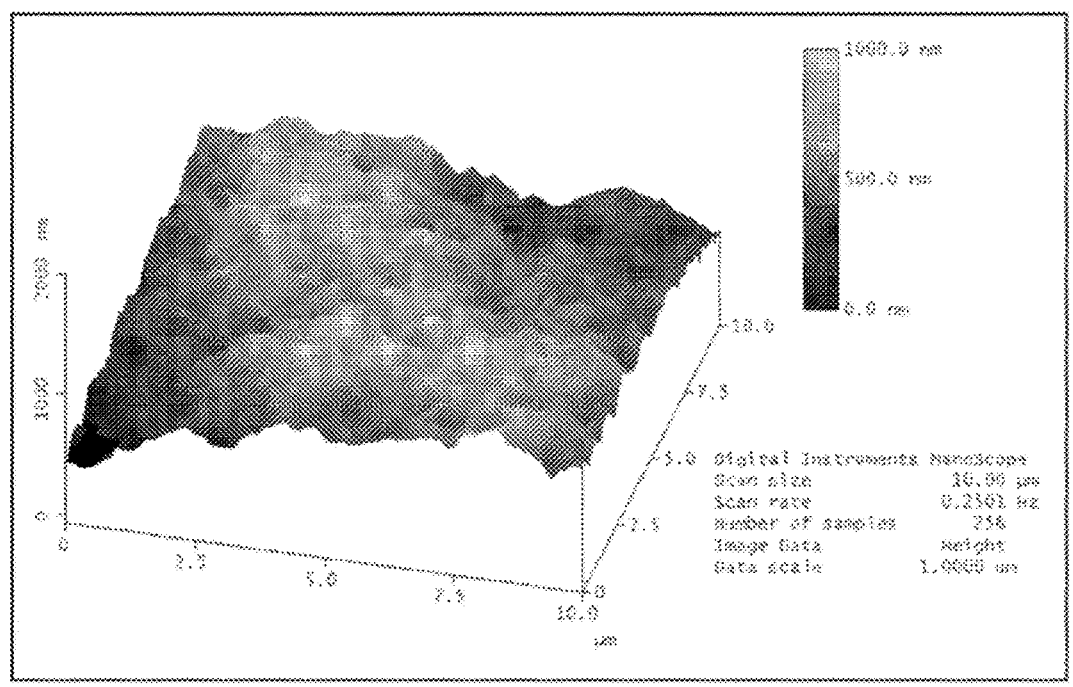
Figure 15C:
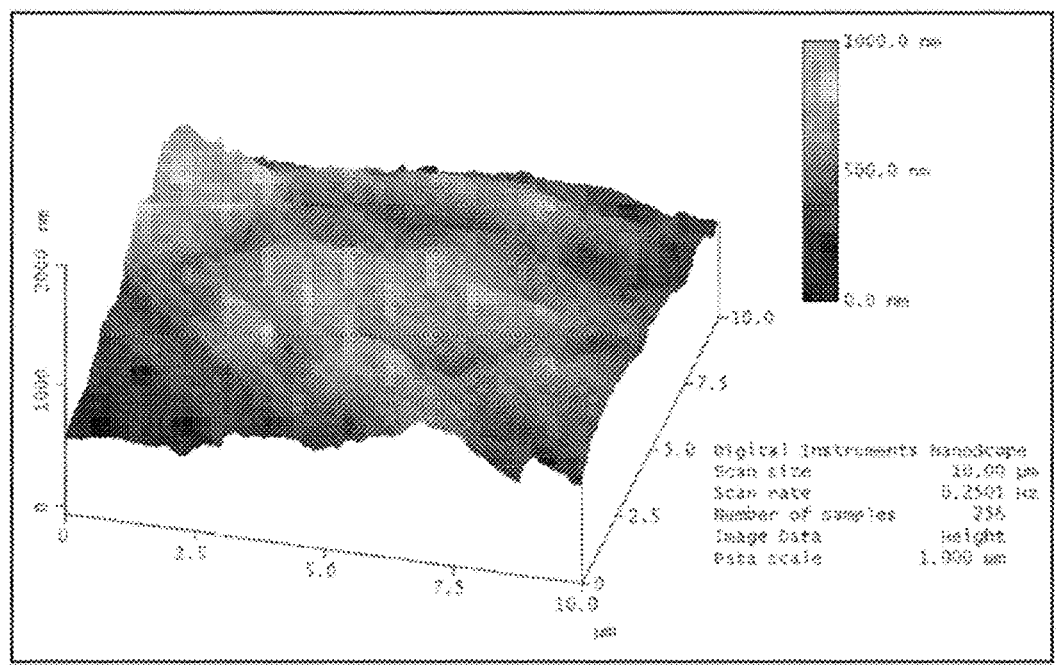
Figure 16:
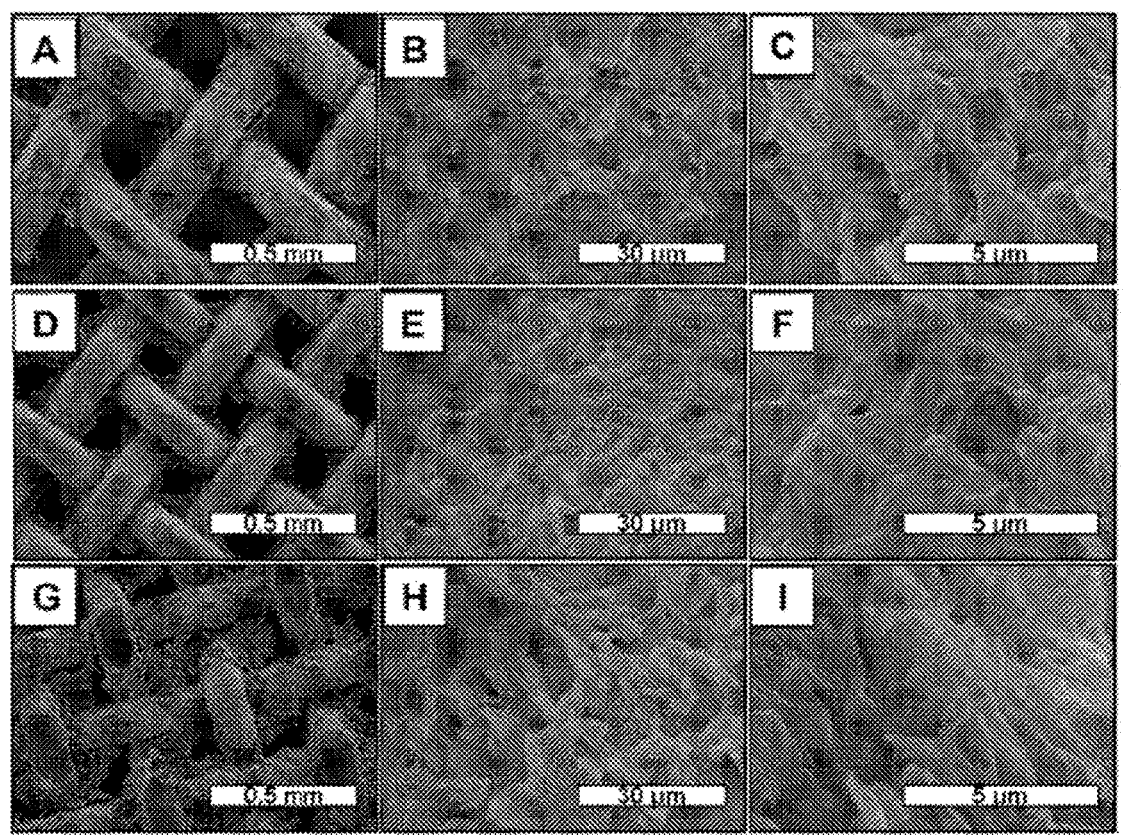
FIGS. 16A-16I are SEM micrographs of the 220 µm mesh with coating varying amounts of polymer.

The roughness of the coatings on the 220 μm mesh was quantified using both atomic force microscopy (AFM) and SEM. AFM was used to probe the most raised portions of 220 μm meshes with various coating concentrations (FIGS. 15A-15C). FIG. 15A is AFM surface plot of a 220 μm mesh coated with a 15 mg/mL polyethylene-xylene solution. FIG. 15B is AFM surface plot of a 220 μm mesh coaled with a 30 mg/mL polyethylene-xylene solution. FIG. 15C is AFM surface plot of a 220 μm mesh coated with a 15 mg/mL polyethylene-xylene solution. The AFM could only probe the highest, most horizontal portions of the coated meshes, since the length of the probe (7 μm) was much smaller than the inherent topography of the woven mesh, and the curvature of the wires would artificially skew the roughness ratio based on sampling location. These sections tended to be free of microstructures (e.g. FIG. 10D); thus, any changes would reflect the characteristics of a baseline coating. To compliment this measurement, a number distribution of pixel greyscale values was generated from the high magnification SEM images (e.g. FIG. 4). The standard deviation of these distributions is known as the SEM index, and has been shown to correlate with surface roughness. See, Banerjee, S.; Yang, R.; Courchene, C. E. *Ind. Eng. Chem. Res.* 2009, 48, 4322-4325., which is incorporated by reference in its entirety. These values are reported in Table 4. As seen in Table 4, a mesh, when coated, has a surface roughness higher than the mesh when uncoated.

Despite not being able to directly measure the roughness ratio of the thickest sections of the polyethylene coating, the SEM index clearly shows an increase in surface roughness with polyethylene coating concentration. The AFM results indicate that although the uppermost surfaces of the steel mesh only becomes coated with polyethylene that is smoother than other sections, it still becomes rougher as the concentration of the coating solution is increased. Overall, the combination of mesh openings on the order of 100 microns, surface structures on the order of 5 microns, and sub-micron features within the microstructures suggests complex wetting behavior that can be further quantified through contact angle analysis.

TABLE 4

Roughness parameters of the 220 μm mesh with various coatings.

| Coating Concentration (mg/mL) | AFM Roughness Ratio of Raised Wire Surfaces | SEM Index |
|---|---|---|
| Uncoated | 1.005 ± 0.003 | 6.58 |
| 15 | 1.053 ± 0.003 | 18.6 |
| 30 | 1.077 ± 0.005 | 21.6 |
| 60 | 1.096 ± 0.006 | 24.1 |

FIG. 1B (center) is an illustration showing the integrated collection system recovering oil; blue represents water, black represents oil. FIG. 1B (left) is a photo of the test tube with windows cut in its side covered with a polymer-coated mesh serving as a filter element. This tube was lowered into beakers with floating oil. FIG. 1B (right) is a photo showing the system during operation. Oil removal occurred on the sides of the device with mesh (left and right in the photo), but not elsewhere (e.g., bottom of photo). The oil immediately flowed through the mesh windows and pooled at the bottom of the test tube from which it was continuously pumped and collected in a separate graduated cylinder. The recovered volume was noted as a function of lime. The first series of recovery experiments used the same 220 μm swatch of mesh coated in 60 mg·mL$^{-1}$ solution of polyethylene-xylenes while varying the oil. The mesh was rinsed with dichloromethane and air-dried between experiments. The second series of experiments used seawater and a single oil, Southern Louisiana crude, while varying the mesh size. Each mesh had been coated in a 60 mg·mL$^{-1}$ polyethylene-xylene solution.

Figure 5:
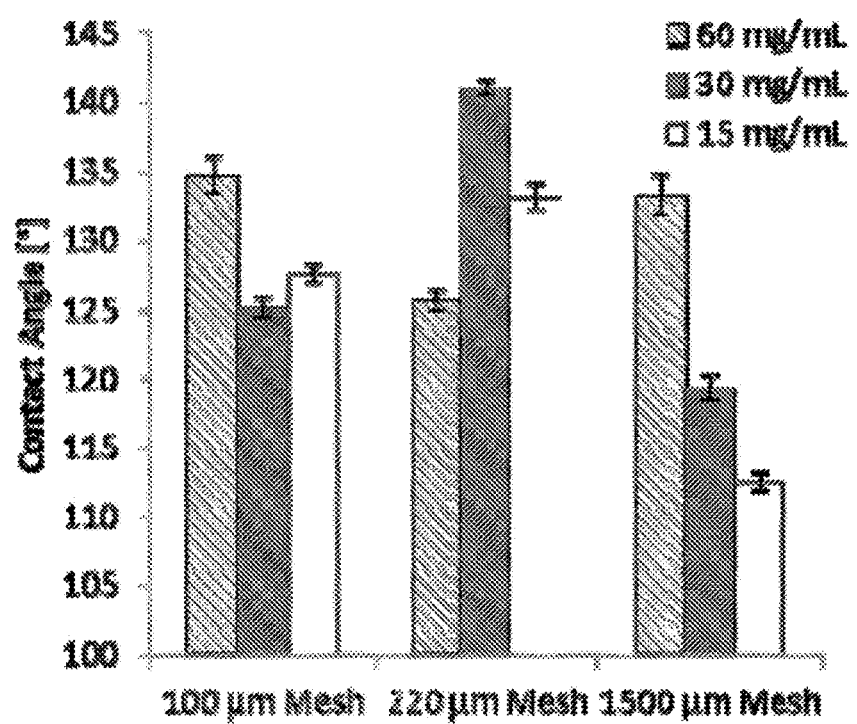
FIG. 5 is a graph showing water contact angles of coated meshes.

The contact angle of a 10 μL drop of water was measured for each of the coated mesh surfaces characterized by optical microscopy (FIG. 5). FIG. 5 shows the measured water contact angles on stainless steel meshes coated in various concentrations of polyethylene-xylene solutions. Mesh size refers to the width of the uncoated openings. Both the coating thickness and roughness increased with solution concentration. As expected given the existence of openings in the mesh beneath the drops (decreasing the value of f), all of the coated meshes exhibited contact angles higher than that of a flat polyethylene surface (about 100°). However, the effect of increasing the coating concentration was less straightforward. The 1500 μm mesh contact angle exhibited an inverse relationship with the coating concentration, while the same relationship was non-monotonic for the 100 μm and 220 μm meshes. In addition, the polyethylene-coated stainless steel mesh was oleophilic, with apparent contact angles for the canola, olive, castor, and crude oils of about 0°. The polyethylene coated mesh had a contact angle of 0° for ethanol and dichloromethane. Therefore, the hydrophobic and oleophilic properties make the polyethylene-coated stainless steel mesh a suitable candidate for water-oil separation. The coated mesh was reused after rinsing with organic solvents.

The water contact angle results can be partially explained by the competing parameters f and $r_f$. As the concentration of the polyethylene-xylene solution increased, the polyethylene coating grew thicker and filled more of the area between the wires. This would increase the area fraction of the projection of polyethylene in contact with the liquid, (f), and decrease the apparent contact angle. However, optical microscopy, SEM micrographs and AFM measurements revealed that higher concentrations also produced rougher coatings, which would increase the value of $r_f$ and increase the apparent contact angle. Furthermore, increasing the roughness will increase f as well, since the submicron features on the polyethylene coatings will likely not become fully wetted by the liquid. Thus, increasing the coating thickness causes both f and $r_f$ to increase, and it is not clear, a priori, which factor dominates.

The largess mesh may be used to isolate the effect of one of the parameters, since its uncoated opening area is about two orders of magnitude greater than the smaller meshes. As the coating concentration increased, the effect on the apparent contact angle from an increasing fraction of polyethylene likely dominated over the effect from a rougher surface, causing the apparent contact angle to decrease monotonically. In contrast, the two meshes with smaller openings would begin with a larger area fraction occupied by the lightly coated wires. For a given increase in concentration, they would experience a smaller relative increase in fractional area. Thus, the dominating parameter (either the roughness ratio or contact fraction) could have switched as the coating thickness increased. However, for any of the meshes, it was difficult to quantitatively decouple these competing effects without the ability to directly measure either, or to understand the role that a heterogeneous coating may have played. Nevertheless, the variation in apparent contact angle and the visibly irregular microstructures strongly suggested that microscale roughness played a significant role in determining the hydrophobic properties of the coated meshes.

For the 100 μm and 220 μm meshes, it appears that the dominating parameter switched as the coating thickened, while it is likely that the relative increase in f dominated for the largest mesh. However, without the ability to directly measure either parameter, quantitatively decoupling these competing effects is difficult. Nevertheless, the variation in apparent contact angle and the visibly irregular microstructures strongly suggest that microscale roughness plays a significant role in determining the hydrophobic properties of these polyethylene-coated meshes.

In addition to its hydrophobicity, the polyethylene-coated stainless steel mesh was oleophilic, with apparent contact angles for the canola, olive, castor, and crude oils of about 0°. The polyethylene-coated mesh has contact angle of 0° for ethanol and dichloromethane. After rinsing with dichloromethane, SEM micrographs revealed no deterioration of the coating or microstructures, demonstrating that the coated mesh can be cleaned with organic solvents and reused. Therefore, the hydrophobic and oleophilic properties make the polyethylene-coated stainless steel mesh a suitable candidate for water-oil separation.

After the oil contact angle experiments, it was observed that the area of mesh which came in contact with the oil was slightly darker in color than other portions. This discoloration indicates persistent wetting by the oil, which was confirmed with SEM micrographs. Contact angles for the 220 μm mesh with a 60 mg·mL$^{-1}$ coating wetted with each type of oil were between 105-110°. The oil displaced any trapped air associated with the rough polyethylene surface, and consequently attenuated the roughness effect. That is, the wetted surface becomes a composite interface of oil and polyethylene, not air and polyethylene. Due to the relatively similar intermolecular forces of polyethylene and the experimental oils, the wetted mesh behaved more like a homogeneous polyethylene surface than a composite surface. Future separation applications of rough surfaces in the presence of a wetting fluid should account for the attenuation of the roughness effect with respect to water breakthrough pressure.

Breakthrough Pressure of Water. When considering the use of the polyethylene-coated mesh as part of an oil spill remediation device, the possibility of submergence requires knowledge of the pressure needed to force water through the hydrophobic mesh. The classical Laplace equation describes the static pressure difference across the water-air meniscus that forms within each capillary-like opening in the coated mesh:

$$\Delta P = \gamma_{LV}\left(\frac{1}{R_1} + \frac{1}{R_2}\right)$$

where $\gamma_{LV}$ is the air-water surface tension, and $R_1$ and $R_2$ are the two orthogonal radii of curvature of the interface. Water will break through the mesh when the local water pressure becomes greater in magnitude than the capillary pressure within the mesh openings.

Figure 6:
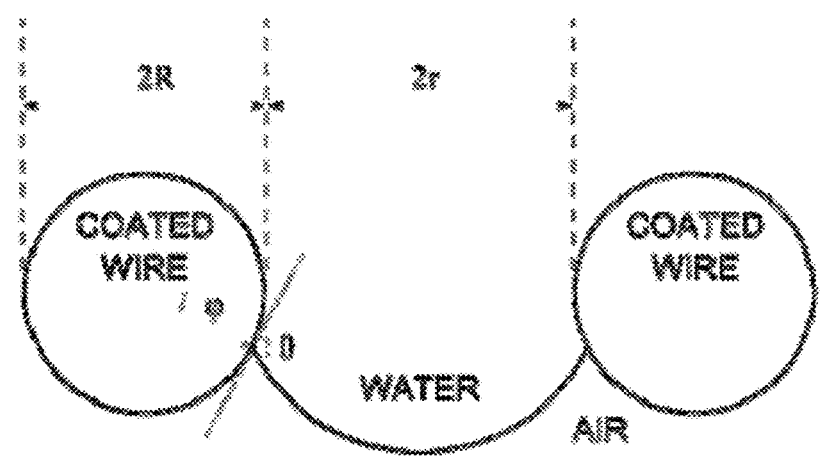
FIG. 6 is a schematic depiction of a liquid-air-mesh interface.

To apply this equation, the mesh openings were idealized to be similar to the hole of a torus. This idealization is an attempt to capture the effect of both the geometry of the woven steel wires, and the shape of the opening after an polyethylene coating was applied. The cross section of such a shape is shown in FIG. 6. As an additional simplification, the meniscus was assumed to take the shape of an axisymmetric spherical cap, which reduced the two orthogonal radii of curvature to a single, mean radius of curvature. The meniscus, oriented to oppose the hydrostatic pressure of the water, must maintain a constant contact angle relative to the tangent of the surface. Strictly speaking, the local contact angle must be equal to the apparent contact angle given by the equation with/equal to one. However, the roughness ratio of the coated wire surface was not known. As a conservative estimate, the model assumed that the local contact angle was equal to the contact angle for a smooth, flat polyethylene surface, θ. This assumption allowed the mean radius of curvature to be found, using the radius of the mesh opening and the contact angle between water and the polyethylene surface.

A similar approach has been used to describe the pressure required to transition to a fully wetted state from a Cassie-Baxter state on a flat surface with a regular array of spherical protrusions. See, e.g., Liu, B.; Lange, F. F.; *J. Colloid Interface Sci.* 2006, 298, 899-909, which is incorporated by reference in its entirety. By adapting the capillary pressure equation described there to the model proposed here, and setting the pressure equal to the hydrostatic pressure of water, the depth of water h required to break through the polyethylene-coated mesh was estimated to be $$h = \frac{-2\gamma_{LV}\cos(\theta + \varphi)}{\rho g(r + R[1 - \cos\varphi])}$$

where ρ is the density of water, g is the gravitational acceleration, θ is the local water contact angle with a smooth polyethylene surface, and φ is the angle the three-phase contact line makes with the horizontal. When φ is equal to zero, the equation is reduced to the common equation for finding the height of a liquid in a capillary tube. As the contact line moves down the pore, die term R[1−cos φ] captures the widening of the pore, while the term cos (θ+φ) represents the apparent contact angle of the meniscus, as seen relative to the vertical in FIG. 6. Since these two factors are in the denominator and numerator, respectively, they compete against one another as φ increases from zero to π−θ. Thus, the equation has some maximum value of h as a function of φ, which represents the maximum depth a mesh with given values of r, R, and θ can withstand before water intrusion occurs.

The local contact angle θ must take into account local roughness and fractional wetted area, neither of which are known. The model assumes the local contact angle is equal to that of a smooth polyethylene surface. The maximum height is relatively insensitive to θ compared to r and R, especially given the large uncertainties present in the pore dimensions (see Table 2). As an example, for the 220 μm mesh with a 60 mg·mL$^{-1}$ coating, it would take a local contact angle of 143° to match the error introduced by the moderate variance in the pore radius. This assumption allows us to find the mean radius of curvature using the radius of the mesh opening and the contact angle between water and the polyethylene surface.

Figure 7:
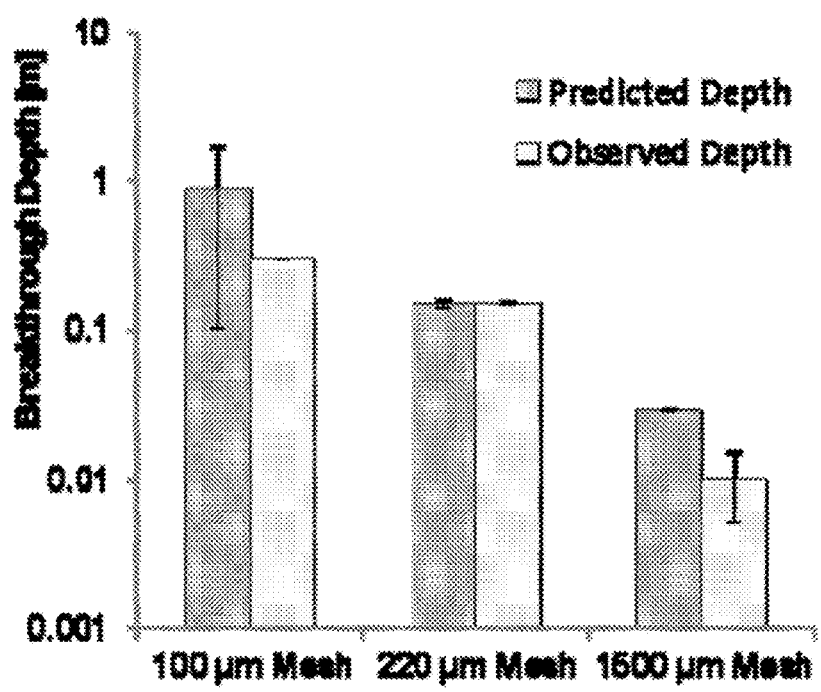
FIG. 7 is a graph showing depths at which water percolated through meshes coated with a 60 mg·mL-1 LDPE-xylene solution compared to the depths predicted. The error bars represent propagation of the mean pore area standard deviation for the predicted depths, and experimental precision for the observed depths.

The polyethylene-coated meshes were tested to determine the breakthrough depth, and compared to results predicted by the equation using the average pore dimensions and a local contact angle of 100°, representing smooth polyethylene (FIG. 7). Water began to percolate through the smallest mesh at a depth of 29 cm, compared to a predicted depth of 88 cm. The predicted depth for the medium mesh, 15 cm, matched the observed depth. The largest mesh only held back 1 cm of water, compared to a prediction of 3 cm. Propagating the standard deviation of the mean pore area (as exhibited by the error bars) reveals that the observed depths agree with the predicted depths to within quantifiable uncertainty, excluding the largest mesh. For that particular case, the discrepancy can be attributed to the small, non-circular pore openings (FIGS. 2D and 4D), which would support a highly non-ideal meniscus. Given such large and irregular morphology, the equation was a poor predictor of the breakthrough depth. However, the expression was a surprisingly good predictor in the other cases, given the heterogeneity seen in the pore size distribution and morphology. In addition, the experimental results confirmed an inverse relationship between pore size and water breakthrough depth, and indicated that the mesh openings must be on the order of hundreds of micrometers or smaller to withstand depths of more than a few centimeters. As a final note, the above model indicated that the coated wire thickness played a role in determining the water breakthrough depth, which was not accounted for by simply assuming the opening was a capillary tube. Such a formulation provided an additional design parameter (besides the pore radius) which can be used to improve the breakthrough depth.

Additional tests using different mesh sizes to determine the breakthrough pressure of water and oil flux into the polyethylene-coated mesh are shown below. These data improve the predictive ability of the models previously developed, and offer a basis for an empirical relationship between the design parameters of the mesh (pore size and coated wire radius) and its performance.

Table 5 contains the results of additional water breakthrough tests. The predicted value arose from using the same model as before. The model predicts the performance of the meshes within experimental error for meshes with average pore radii lengths between 130 μm (the largest tested in this series) and 7 μm. The model over predicted the breakthrough pressure for the mesh with average pore radii of 4.5 μm, which may be due to the irregular shape of the pore, or the wide range of pore sizes observed for this mesh. Error in the mesh size parameters represents the standard deviation of those measurements over a representative sample of the mesh surface. Error in the predicted depth is due to propagation of error in these size measurements. Error in the measured depth is the standard deviation of three replicate measurements.

TABLE 5

Predicted and measured breakthrough depths of water through the hydrophobic mesh.

| Mean Effective Pore Radius r (μm) | Mean Coated Wire Radius R (μm) | Predicted Water Breakthrough Depth (cm) | Measure Water Breakthrough Depth (cm) |
|---|---|---|---|
| 127 ± 7 | 83 ± 10 | 8 ± 2 | 7.4 ± 0.5 |
| 55 ± 3 | 71 ± 9 | 16 ± 1 | 15 ± 1 |
| 40 ± 9 | 119 ± 6 | 16 ± 5 | 17 ± 1 |
| 29 ± 6 | 27 ± 6 | 25 ± 6 | 25 ± 1 |
| 7 ± 3 | 55 ± 9 | 33 ± 16 | 25 ± 1 |
| 4 ± 2 | 27 ± 5 | 88 ± 24 | 41 ± 1 |

Feasibility of Separation and Recovery of Oil. The polyethylene coated meshes were initially evaluated for use in oil-water separations using proof of concept testing. First, a 1500 μm mesh was coated in a 60 mg·mL$^{-1}$ polyethylene-xylene solution as described above. It was then folded into boat-like shape and its separation ability tested by both "bottom-up" and "top-down" methods. The "bottom-up" method tested the ability of the mesh to recover oil from a layer atop a pool of water. The hydrophobicity of the coated boat was clearly demonstrated by its ability to float on a water surface without sinking. When the boat was put on a floating layer of oil, the oleophilic nature of the boat allowed the oil to percolate through the mesh and accumulate inside the "boat". At the same time, the hydrophobic nature of the coated mesh prevented the water from entering, achieving effective oil-water separation. Compared to the original oil-water system, all visible oil was completely removed, and the oil was pipetted into another container without forming a visible layer of water. This test exhibited the ability of the polyethylene-coated mesh to draw oil through it via capillary action, even upwards against gravity. Thus, oil-water separations may not need to be driven by hydrostatic pressure; depending on the mesh characteristics and desired oil flux, the oleophilic polyethylene coating alone can drive the separation.

In contrast, the top-down method was more similar to a filtering process. When an oil-water mixture was poured into a polyethylene-coated mesh boat identical to the one used in the bottom-up lest, the oil passed through the oleophilic boat. The water was retained inside, where it could be easily collected. The resultant oil and water fractions were clearly separated from one another. The polyethylene-coated mesh was able to allow the percolation of oil without the concomitant passage of water, despite the presence of both.

After both of the above experiments, the area of mesh which came in contact with the oil was slightly darker in color than other portions. This discoloration indicated persistent welting by the oil. Presumably, this wetting reflected oil displacement of any trapped air associated with the rough polyethylene surface, and consequently it attenuated the effect of roughness. That is, the wetted surface became a composite interface of oil and polyethylene, not air and polyethylene as assumed above. Due to the relatively similar intermolecular forces of polyethylene and the experimental oils, the wetted surface would behave more like a homogeneous polyethylene surface than a composite surface.

Continuous Recovery of "Spilled" Oil Floating on Water, To assess the rate of oil recovery using hydrophobic meshes, a bench-scale oil collection unit was constructed by integrating the polyethylene-coated meshes into a continuous pumping system (FIG. 1B). By immersing this unit into various oils floating on water, the rates of oil recoveries as a function of mesh size and oil viscosity were measured.

Figure 8A:
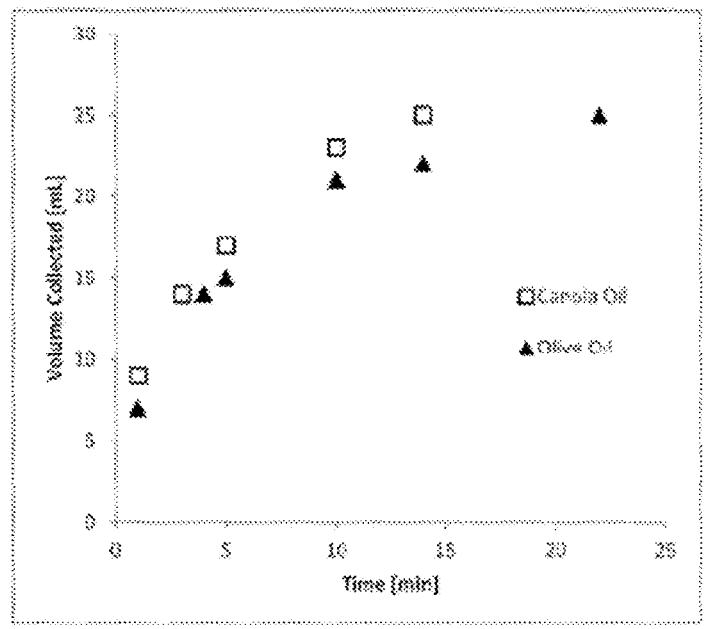
FIGS. 8A-8B illustrate results for the recovery of a simulated 25 mL oil spill by a collection system for different common oils. The top panel shows results at short times (<25 minutes) and the bottom panel shows the complete results over a few hours, including the highly viscous castor oil. A 220 μm mesh coated in a 60 mg·mL-1 LDPE-xylene solution was used each time.
Figure 8B:
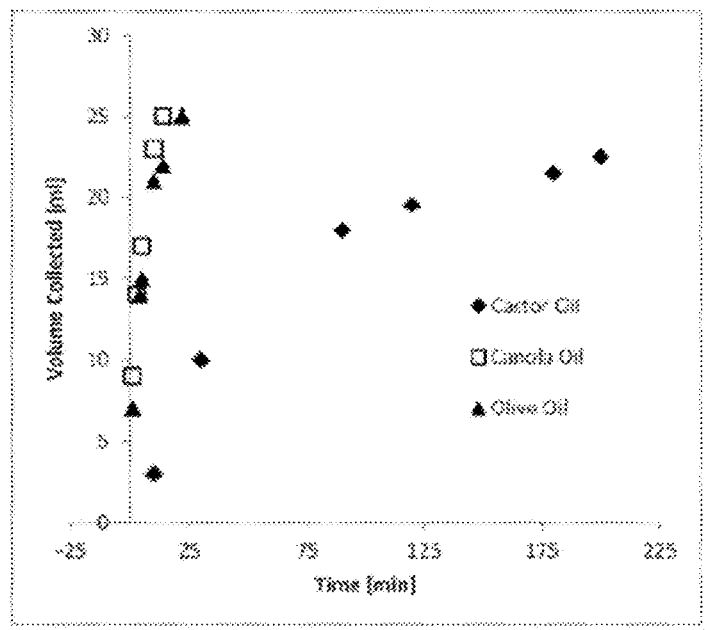
Figure 9A:
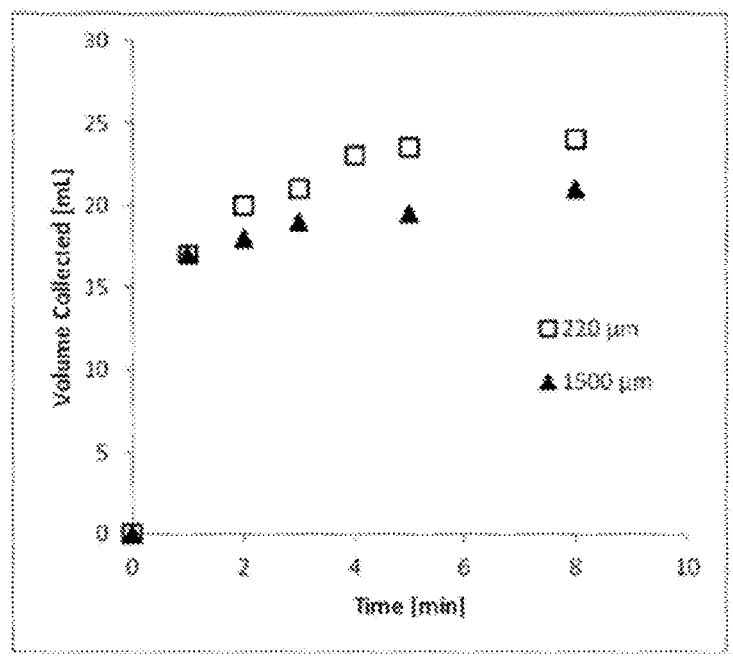
FIGS. 9A-9B illustrate results of oil spill recovery tests of 25 mL of Southern Louisiana crude oil floating on Boston Harbor seawater with the collection system equipped with varying mesh sizes. The listed mesh sizes refer to the uncoated opening widths; each mesh was coated in a 60 mg·mL$^{-1}$ LDPE-xylene solution before use. The top panel shows results for the first 10 minutes and bottom panel shows the same results over 2 hours.
Figure 9B:
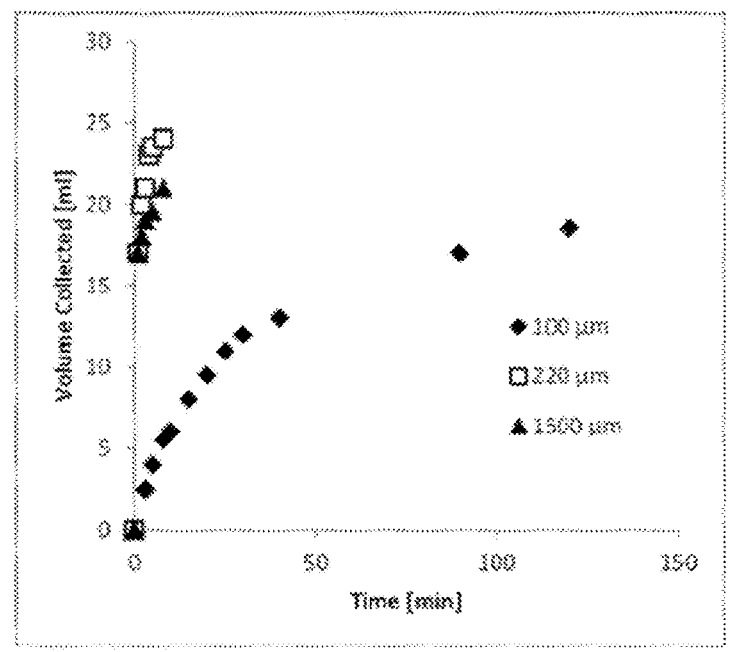

First, using three cooking oils that exhibited viscosities that vary by more than a factor of 10 (Table 1), the dependency of oil recovery rates on oil viscosity (FIG. 8) was tested. For the less viscous canola and olive oils, 25 mL of oil were recovered in a matter of minutes. The more viscous castor oil required about 2 hours to fully recover the same volume. Next, the effect of mesh size was tested using a single oil, Southern Louisiana crude, and seawater from Boston Harbor. Most of the initial 25 mL of oil was recovered in a few minutes with the large and medium mesh sizes (FIG. 9). In contrast, the finest mesh size still had collected only about 70% of the same volume after 2 hours.

Much of the requisite time may have involved the slow flow of the oil across the surface of the water (e.g., see picture on right in FIG. 1B). Building from this hypothesis, it was determined that there were three possible transport mechanisms that could limit the observed oil flow rate. The first was the rate at which oil spreads across the surface of the water to arrive at the surface of the hydrophobic mesh.

Since the supply of spilled oil in the container was not refreshed, the oil layer thinned as it was collected and pumped away, which decreased the already meager head pressure (<100×capillary pressure) driving oil (low to the mesh. The second mechanism was (he pumping of oil away from the inside of the collector. The pump was always run at a high enough rate to ensure that the inner face of the polyethylene was never submerged in oil, thus maintaining a constant atmospheric pressure on the downstream side of the mesh. The final and most relevant transport mechanism was the flow through the polyethylene-coated mesh. Assuming that it is largely driven by capillary action, the Washburn equation (see, e.g., Washburn, E. W.; *Phys. Rev.* 1921, 17, 273-283, which is incorporated by reference in its entirety) can be applied to estimate the flux:

$$q = \frac{1}{4(R+r)^2} \cdot \frac{\pi r^3 \gamma_{LV}}{4\eta(2R)}$$

where q is the volumetric flow rate of oil per unit area of mesh, $\gamma_{LV}$ is the liquid-vapor surface tension of the oil, and $\eta$ is the dynamic viscosity of the oil. In deriving this equation, the hydrostatic head of the oil was neglected, the oil was assumed to fully wet the polyethylene coating, the capillary length was approximated by twice the coated wire radius (2R), and the term $1/4(R+r)^2$ represented the number of pores per unit area of mesh (the inverse is the surface area occupied by a single mesh opening and surrounding wire).

Given that a thinning layer of oil decreased the oil-mesh contact area, A, and that the rate of oil spreading was observed to limit the flow throughout most of the experiment, the initial rate of oil uptake was the only measured flux which would be controlled by capillary action. Table 6 shows the initial area of mesh in contact with the oil (between 1-4 cm²), and compares the initial fluxes observed with the fluxes predicted by the equation above based on the previously calculated values of r and R.

TABLE 6

Comparison of the observed and predicted initial flow rates of oil.

| | Observed Initial Flux (L/s · m²) | Predicted Initial Flux[c] (L/s · m²) | Initial Oil-Mesh Contact Area (cm²) |
|---|---|---|---|
| Mesh[a] | | | |
| 100 μm | 0.034 ± 0.003 | 0.013 ± 0.022 | 3.88 ± 0.02 |
| 220 μm | 2.3 ± 0.2 | 0.9 ± 0.3 | 1.22 ± 0.01 |
| 1500 μm | 20 ± 7 | 295 ± 101 | 2.43 ± 0.01 |
| Oil[b] | | | |
| Castor | 0.046 ± 0.004 | 0.076 ± 0.017 | 1.22 ± 0.01 |
| Olive | 0.96 ± 0.17 | 0.78 ± 0.19 | 1.22 ± 0.01 |
| Canola | 1.23 ± 0.19 | 0.82 ± 0.20 | 1.22 ± 0.01 |

[a]Size indicates uncoated width opening. All meshes were coated with a 60 mg · mL⁻¹ polyethylene-xylene solution. Southern Louisiana crude oil in seawater was used each time.
[b]Each oil was run through the same 220 μm mesh coated with a 60 mg · mL⁻¹ polyethylene-xylene solution, which was cleaned with dichloromethane and air-dried between uses.
[c]Error represents propagation of mean pore area standard deviation.

The Washburn equation demonstrated suitable predictions of the initial flux when the oil viscosity was varied for a single mesh. The experimental and calculated uncertainties overlapped, or nearly so, and the observed initial flux rate exhibited an inverse relationship with viscosity as expected. However, when the mesh was varied using the same oil, significant deviations were observed. For the largest mesh, the initial flux was smaller than expected by about a factor of 20. Since both the 220 μm and 1500 μm meshes had the same initial flow rate, it is possible that the rate-limiting transport mechanism was not capillary action through the mesh, but either the transport of oil across the water surface, or the maximum pumping rate from the collector. The other meshes demonstrated fluxes about 3 times higher than expected, but given the large non-numeric uncertainties generated from calculating a mean effective pore radius and wire diameter, this was not an unreasonable result. And, as seen in FIG. 9, overall there was an inverse relationship between flux and pore size, in agreement with the Washburn equation. This result signified a trade-off between oil flow and water intrusion resistance as pore size decreased.

TABLE 7

Comparison of predicted and measured oil flux through polyethylene (LDPE)-coated mesh of various sizes.[a]

| Mean Effective Pore Radius r (μm) | Mean Coated Wire Radius R (μm) | Predicted Oil Flux (L/m²/s) | Measure Oil Flux (L/m²/s) |
|---|---|---|---|
| 4 ± 2 | 27 ± 5 | 0.13 ± 0.08 | 0.05 ± 0.01 |
| 24 ± 9 | 54 ± 37 | 1.8 ± 0.8 | 0.08 ± 0.01 |
| 40 ± 9 | 119 ± 6 | 1.8 ± 0.7 | 0.12 ± 0.01 |
| 55 ± 3 | 71 ± 9 | 20 ± 3 | 0.9 ± 0.1 |
| 55 ± 3 | 167 ± 22 | 0.8 ± 0.3 | 0.96 ± 0.09 |
| 80 ± 7 | 135 ± 22 | 3.2 ± 1.2 | 1.25 ± 0.14 |
| 121 ± 7 | 89 ± 10 | 17 ± 4 | 1.3 ± 0.1 |
| 135 ± 7 | 83 ± 9 | 28 ± 7 | 1.8 ± 0.2 |

[a]All tests conducted with a layer of olive oil maintained at 0.5 cm thickness, and an oil contact area of 1.5 cm².

Table 7 contains the results of addition oil flux experiments. These experiments are identical to the ones that generated the data found in Table 6, except only one oil type was used (olive oil, same source as before) while the mesh size was varied. Here, the model used previously tends to overpredict the oil flux through the mesh. Thus, these mesh openings appear to not behave like capillary tubes, likely from being too shallow or non-circular. However, these results are still valuable as an empirical dataset from which future mesh performance can be predicted. In addition, based on previous results, prediction of mesh performance based on the viscosity of oil appears to still remain well modeled by the equation.

Figure 17:
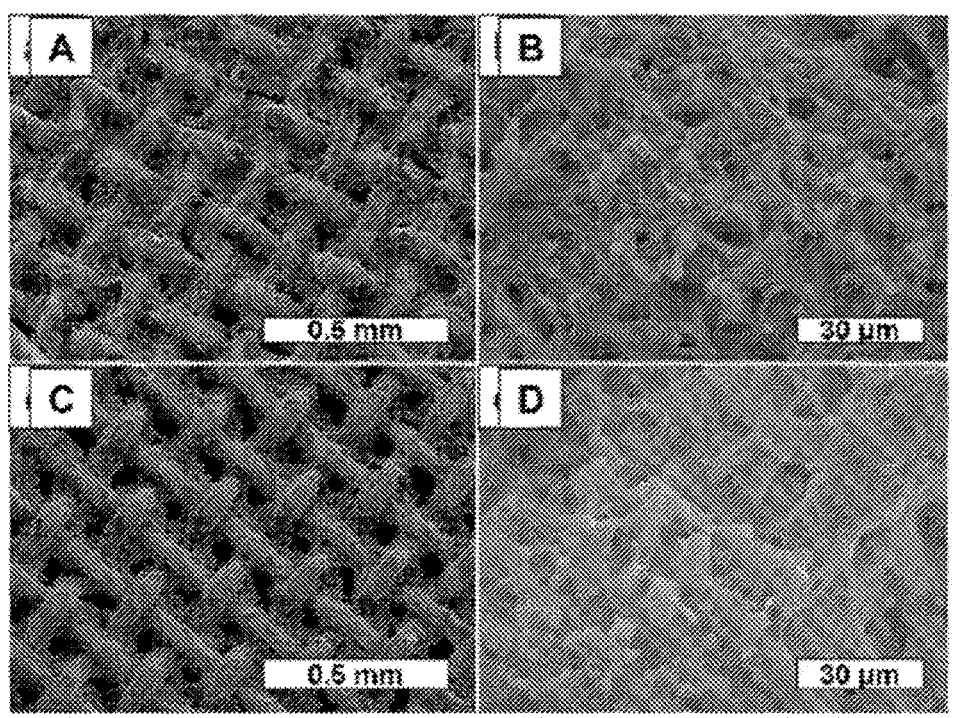
FIGS. 17A-17D are SEM micrographs of a 100 µm mesh with a 60 mg/mL LDPE-xylene coating before (FIGS. 17A and 17B) and after (FIGS. 17C and 17D) separating crude oil and being rinsed with dichloromethane.

Effect of Rinsing with Dichloromethane. A 100 μm mesh coated with a 60 mg/mL polyethylene-xylene solution was used to separate 25 mL of Kuwait crude oil from seawater. After, the mesh was rinsed with dichloromethane to remove the oil. SEM micrographs of the coating before separation and after rinsing are shown in FIG. 17. The solvent did not visibly erode the coating, indicating it can be reused multiple times and rinsed with nonpolar solvents to remove adhered oil.

Persistent Wetting of Meshes by Oil. A 100 μm mesh coated with a 60 mg/mL polyethylene-xylene solution was used to separate olive oil from water (FIGS. 18A-18B). The oil persistently wetted the mesh, filling the interstitial spaces of the mesh and covering all but the most raised potions of the woven wires. The oil fills the interstitial spaces of the mesh (FIG. 18A), making the surface much smoother (FIG. 18B). This lowered the water contact angle of the mesh.

Finally, for each experiment, the oil permeate was collected and analyzed for water content by gravimetric desiccation. In all cases, the permeate contained less the 1% water by mass, which was the experimental detection limit.

Despite being in contact with both oil and water during the experiment, the polyethylene-coated meshes were able to successfully reject nearly all of the free-phase water.

Hydrodynamic Modeling

1. Purpose

The goal of these experiments is to evaluate the ability of hydrophobic meshes with a rough polyethylene coating to reject water and percolate oil under "wavy" conditions. Previous experiments have tested these abilities under calm conditions (no waves and zero water velocity) in bench-scale experiments where capillary forces are believed to dominate. By increasing the size of the meshes, and subjecting them to significant hydraulic forces (both hydrodynamic and hydrostatic) in a wave tank, these experiments aim to predict how these meshes will behave in under conditions relevant to field deployment in the open ocean.

2. Modeling Approach

The forces on an object in the presence of waves are complex and heavily dependent on the shape and orientation of the object. In order to be able to model the forces acting on all points of the hydrophobic mesh, the system was simplified as much as possible.

Figure 18:
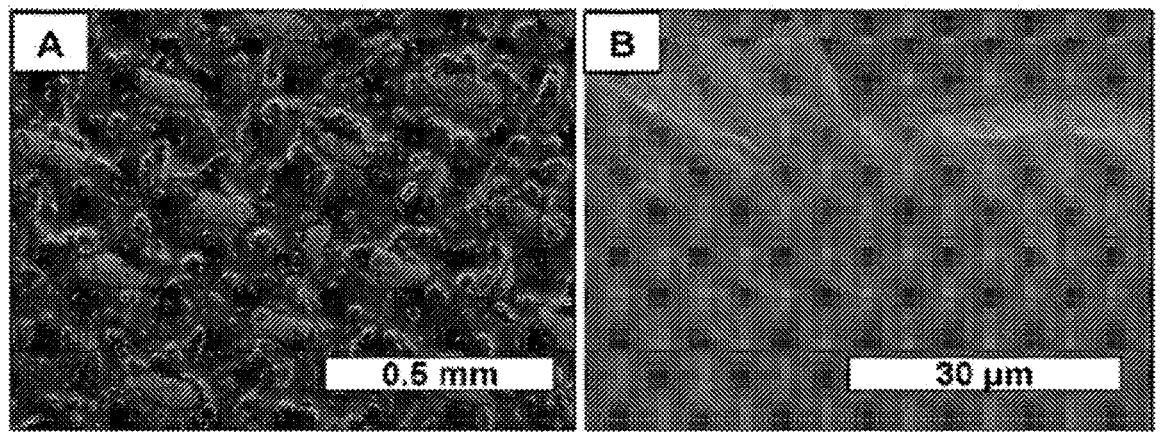
FIGS. 18A and 18B are SEM micrographs showing olive oil wetting a 100 µm mesh coated with a 60 mg/mL LDPE-xylene solution.
Figure 19:
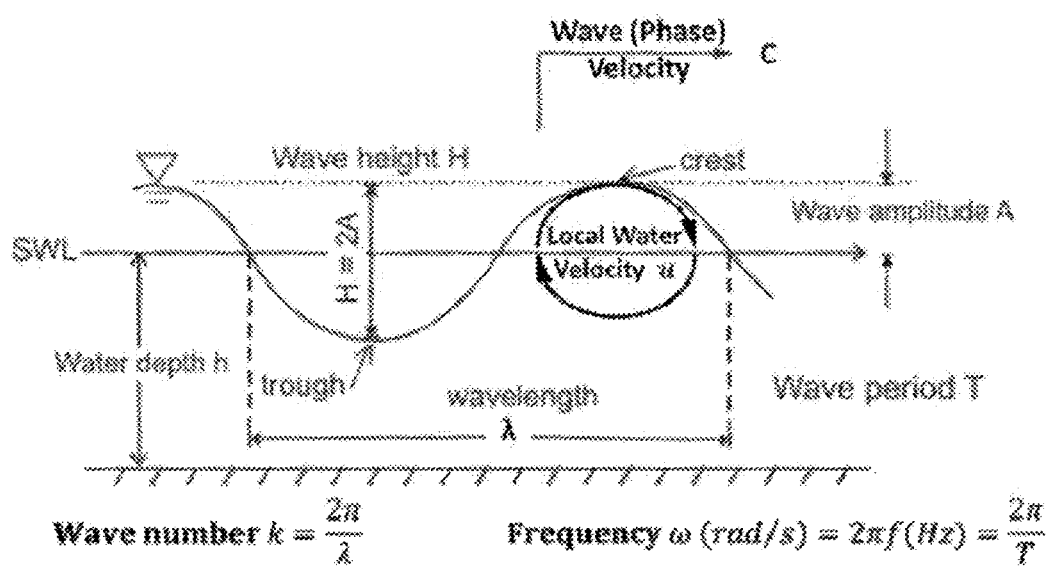
FIG. 19 is a diagram of parameters used to describe a linear wave.

First, the waves observed in the tank via video and level meter were modeled as linear, sinusoidal waves with the same frequency, wavelength, and average height as the waves observed in the tank. This idealization allows the use of an analytically solvable equation, and will provide an initial assessment of the results with much less computation. FIG. 18 diagrams the parameters associated with a linear wave.

Figure 20:
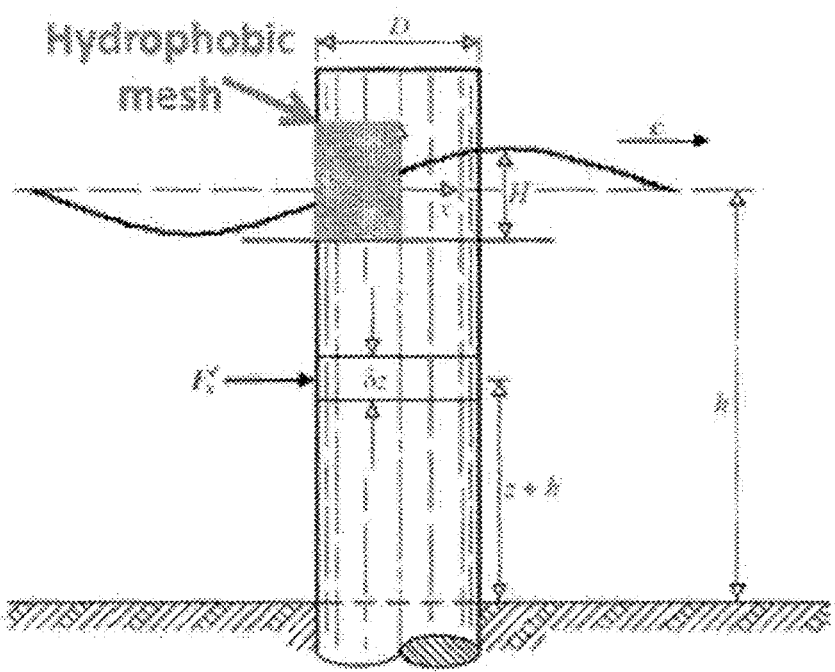
FIG. 20 is a schematic depiction of estimate hydrodynamic forces.

The recovery device was designed as a fixed cylinder extending from above the waves to the bottom of the tank. The cylinder is hollow, with windows cut at the water level. Meshes were fixed over these windows with silicone adhesive, effectively creating a larger version of the bench-scale tests. The schematic in FIG. 20 shows this apparatus, along with a definition of the parameters used in subsequent equations. The mesh is oriented to face the oncoming wave, covering the "front" half of the cylinder. Oil is continuously removed from inside the cylinder.

The force acting on the cylinder in the positive (right) horizontal direction per unit length ($F_x'$[N/m]) for linear waves is given by the well-known Morison Equation (Eqn 1), a semi-empirical relationship that has been shown to apply to cylinders in oscillatory flow that accounts for both drag and inertial forces on the cylinder. See, Morison, J. R.; O'Brien, M. P.; Johnson, J. W.; Schaaf, S. A. (1950). *The forces exerted by surface waves on piles*. Petroleum Transactions, 189, 149-154, which is incorporated by reference in its entirety.

$$F_x' = \frac{1}{2}\rho D C_d |u| u + \frac{1}{4}\rho D^2 C_i \frac{du}{dt} \qquad 1)$$

Figure 21A:
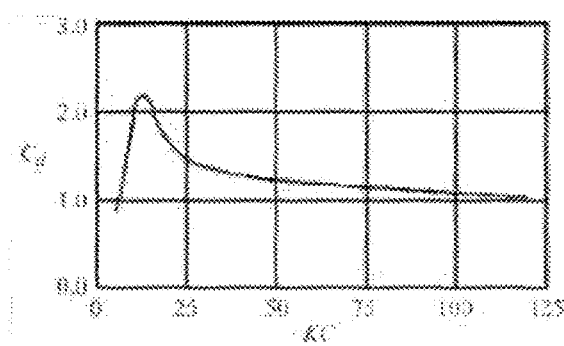
Figure 21B:
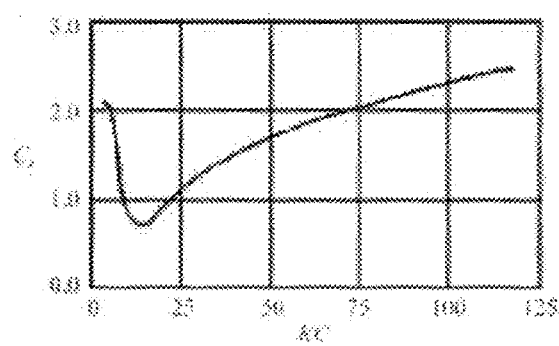

Above, $\rho$ is the density of the fluid [kg/m$^3$], D is the diameter of the cylinder [m], $\mu$ is the local velocity of the wave particles, defined in Equation 2a from linear wave theory (Sarpkaya, 1986), and $C_d$ and $C_i$ are the drag and inertia coefficients, respectively. See, Sarpkaya, T. (1986). *Forces on a circular cylinder in viscous oscillatory flow at low Keulegan-Carpenter numbers*. Journal of Fluid Mechanics, 165(61-71), 11-15, which is incorporated by reference in its entirety. These coefficients are an empirical function of the Keulegan-Carpenter (KC) number (Eqn 3), and were obtained from FIG. 21. See, Keulegan, G. H., & Carpenter, L. H. (1956). *Forces on cylinders and plates in an oscillating fluid*. US Department of Commerce, National Bureau of Standards, which is incorporated by reference in its entirety.

$$u = \frac{H\omega \cosh[k(z+h)]}{2\sinh(kh)}\cos(kx - \omega t) \qquad 2a)$$

$$\frac{du}{dt} = \frac{H\omega \cosh[k(z+h)]}{2\sinh(kh)}\cos(kx - \omega t) \qquad 2b)$$

$$KC = \frac{u_{max}T}{D} \qquad 3)$$

Using these equations, the force on the cylinder was estimated as a function of time. This quantity is then correlated to an estimation of the volumetric flow per unit area (flux) through the mesh, outlined below.

3. Oil Flux Measurement

Flux is the volumetric flow rate of oil through the mesh, per unit area of the mesh, [L/(m$^2$s)]. Understanding the flux of the oil, rather than the flow alone, is required to compare its performance in different devices, and to predict its behavior in larger prototypes.

3.1 Oil Flow Rate

Measuring the flow rate [L/s] of oil through the mesh used in the tank was straightforward. Oil was drawn through the mesh by capillary forces, flowed down the inner surface of the cylinder, and then pooled at the bottom. A peristaltic pump was used to draw up the pooled oil with a fixed sampling Sine. The pumped oil was collected in a tared glass container, whose weight was measured as a function of time with an electronic scale. The container was periodically emptied into the wave tank, in order to maintain a constant thickness of the oil layer. As long as the pump was run at a high rate (such that no oil was pooled inside the cylinder), the flow rate was controlled by passage through the hydrophobic mesh. The sampling time for the scale was longer than the wave period. Thus, this method measures the average flow rate through the mesh, after the system had reached a steady-state flow.

3.2 Oil Contact Area

The area through which the oil flowed was more difficult to determine. The width of the mesh in contact with the oil was known and constant. Under calm conditions, the thickness of the oil layer was between 0.7 and 1 cm thick. Over the course of 2 weeks of testing, this thickness slowly decreased due to evaporation. Frequent testing confirmed that this value never changed significantly (<0.1 cm) over the course of a test. However, two other factors affected the contact area. First, the thickness of the oil layer would increase at higher wave frequencies. Second, the wave heights would occasionally become larger than the height of the mesh, which decreases the time-averaged contact area. Estimating the magnitude of these effects introduced the majority of the uncertainty in the flux measurements.

3.2.1 Varying Oil Thickness due to Waves

Figure 22A:
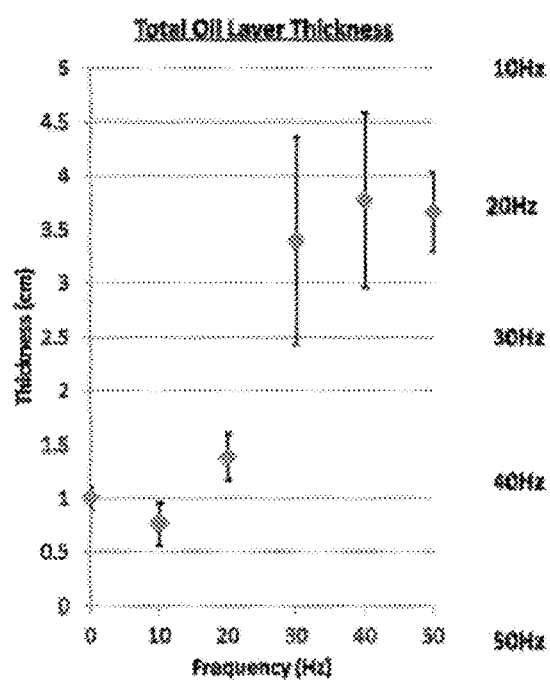

The diesel fuel used in the tank tended to emulsify at higher wave frequencies (higher wave energies), entraining water in the oil layer, and increasing its apparent thickness. Emulsification was caused by waves breaking in the far side of the tank, near the wave generator. The breaking waves also pushed the oil layer toward the mesh, decreasing the overall area of the slick, and increasing its thickness. FIG. 22 shows the variation in oil thickness due to emulsification and wave pushing. Thickening was due to water entrainment and pushing of the diesel layer. Photos are not to scale.

Figure 22B:
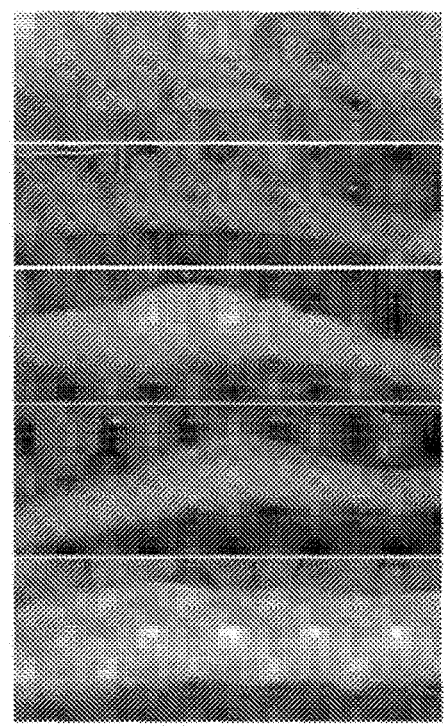

The photos in FIG. 22B show that the oil layer only partially emulsified. More water was entrained on the bottom of the layer, closer to the water. The fraction of the layer emulsified could only be roughly estimated. The entrained water droplets appeared to be large in size, and the emulsion broke 10-20 minutes after the waves were stopped. The effect of the entrained water on the rate of oil percolation through the mesh is unknown; only the change in thickness was accounted for.

3.2.2 Oil Topping

The highest waves were produced for the middle range of wave frequencies (full range: 0-0.83 Hz). These waves tended to rise significantly above the calm water level, and only slightly below. As the waves rose above the top of the mesh-covered opening, oil would not be in contact with the mesh. For some fraction of the cycle, the oil is not percolating through the mesh, and so the time-averaged flux must be adjusted upward. This fraction was estimated using the idealized linear waves, not actual wave height data, which was too sparse.

4. Water Content of Effluent

The water content of oil that had passed through the mesh was monitored. Once the flow had reached steady state, a 40-50 mL sample was taken directly from within the cylinder. Samples were often emulsified, but this may have been due to mixing in the sample line, which had significant turbulence due to air bubbles. The sample was allowed to settle for at least 24 h, and then the water fraction was removed and measured volumetrically. The two phases always seemed to completely separate by settling. To confirm this, an aliquot of the oil fraction was taken and the water content was measured using Karl-Fisher titration. Ail measured sample had less than 0.05% water by mass, the limit of detection. The correlation between wave force and water content is described in Section 5.2.

5. Results of Short Term Testing 5.1 Wave Tank Parameters

Figure 23:
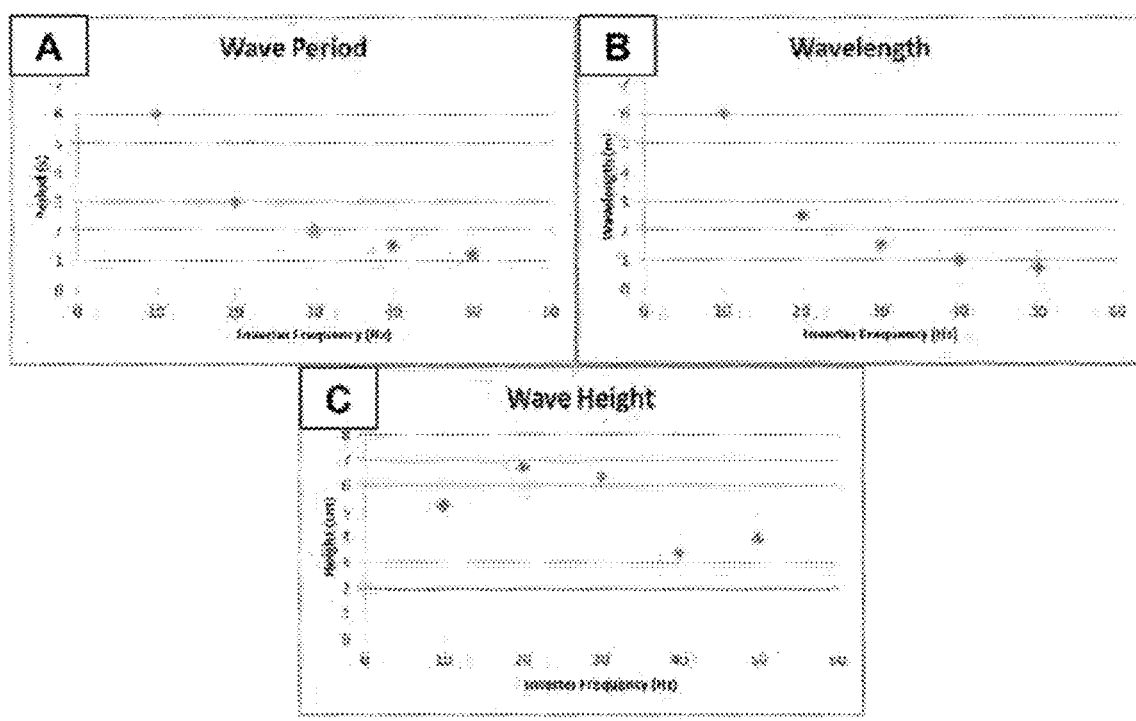
FIGS. 23A-23C are graphs showing parameters of the wave tank as a function of the generator frequency, which was used as the controlling variable.

First, the properties of the wave tank were measured as a function of the frequency of the electrical signal controlling the wave generator (0-60 Hz). FIG. 23 shows these results. In general, the wavelength and wave period decreased as a function of the signal. The wave height was largest in the middle set of frequencies. The generator frequency was generally 60 times larger than the wave frequency.

5.2 Oil Flux and Water Content

Figure 24:
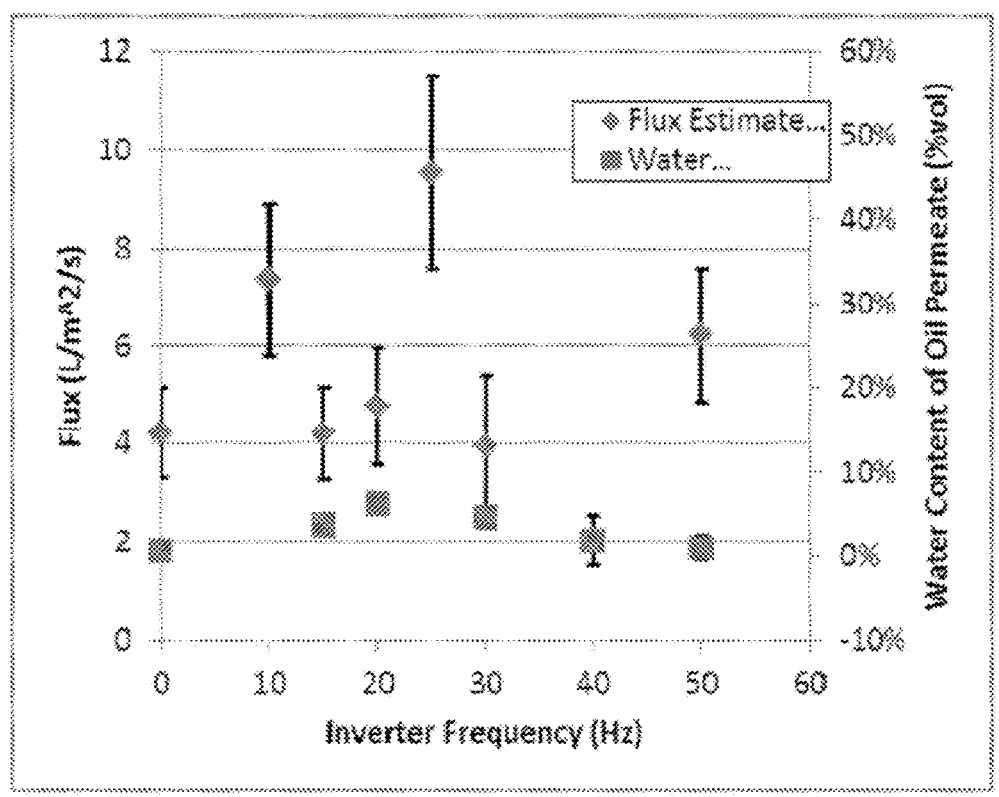
FIG. 24 is a graph showing correlation between generator frequency and both oil flux and water content of the effluent.

FIG. 24 shows the results of testing an polyethylene-coated mesh with pore radii of 90 μm attached to a cylinder 6 cm in diameter. Fluxes have been corrected for oil topping and changing thickness of the oil layer. The data point at 0 Hz is the oil flux under calm conditions. There is no clear relationship between the frequency of the waves and the oil flux. However, waves either have little effect on the flux, or improve the flux by a factor of 1.5-2. Simultaneously, the water content of the effluent never rose above 10%. If the mesh had no ability to repel water, the separation efficiency would have been around 60%, based on fractional area exposed to water. This data suggests that a mesh can be used under wavy conditions while still maintaining a separation efficiency much higher than that of common oil spill response technologies.

5.3 Correlation to Wave Forces

Using the Morison equation to estimate the hydrodynamic forces, and the depth of the water at any given point to estimate the hydrostatic forces, the total hydraulic forces due to wave action in the positive horizontal direction (toward the mesh) were estimated. Hydrodynarnie forces that acted in the negative horizontal direction during wave troughs were ignored, as these would not push the oil through the mesh, nor remove it from contact. Forces represent the average total force over a wave cycle, and over the entire mesh surface. The correlation to both water content and oil flux are shown in FIGS. 25-26.

Figure 25:
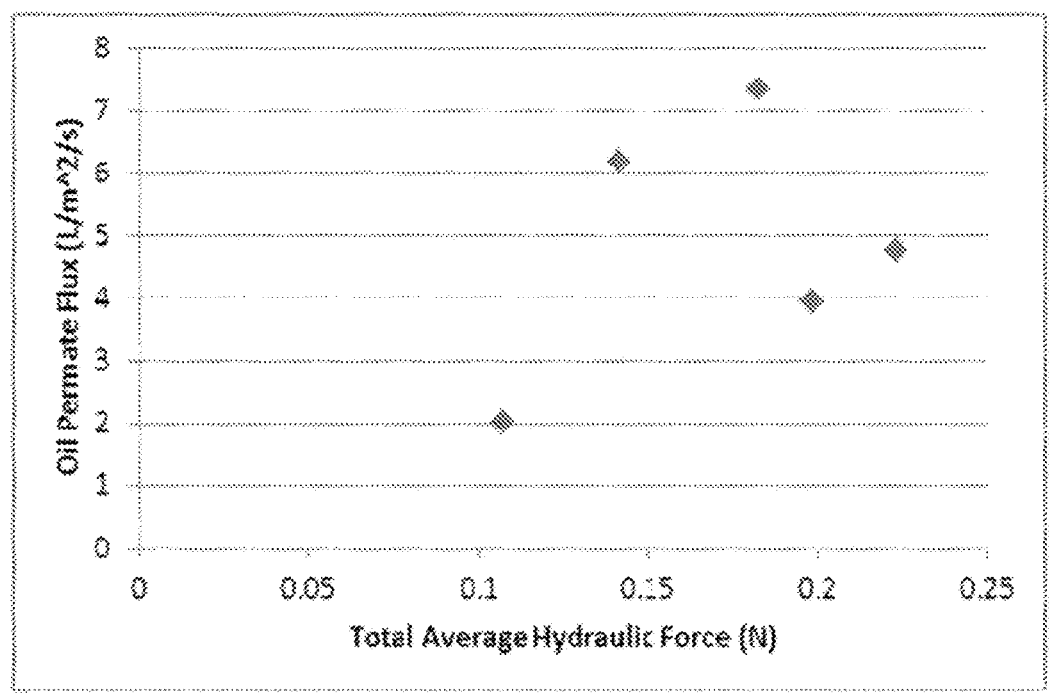
FIG. 25 is a graph showing relationship between oil flux and total hydraulic force for a 90 µm mesh on a 6 cm cylinder.

FIG. 25 shows no relationship between the oil flux and the hydraulic force. It's unclear if this lack of correlation is due to wave phenomenon in the tank (i.e. reflected waves), an incomplete estimate of factors that affect the average oil contact layer, or some unaccounted for phenomenon. However, in agreement with FIG. 6, the wave forces never caused a decrease in the oil flux, only sporadically increased it.

Figure 26:
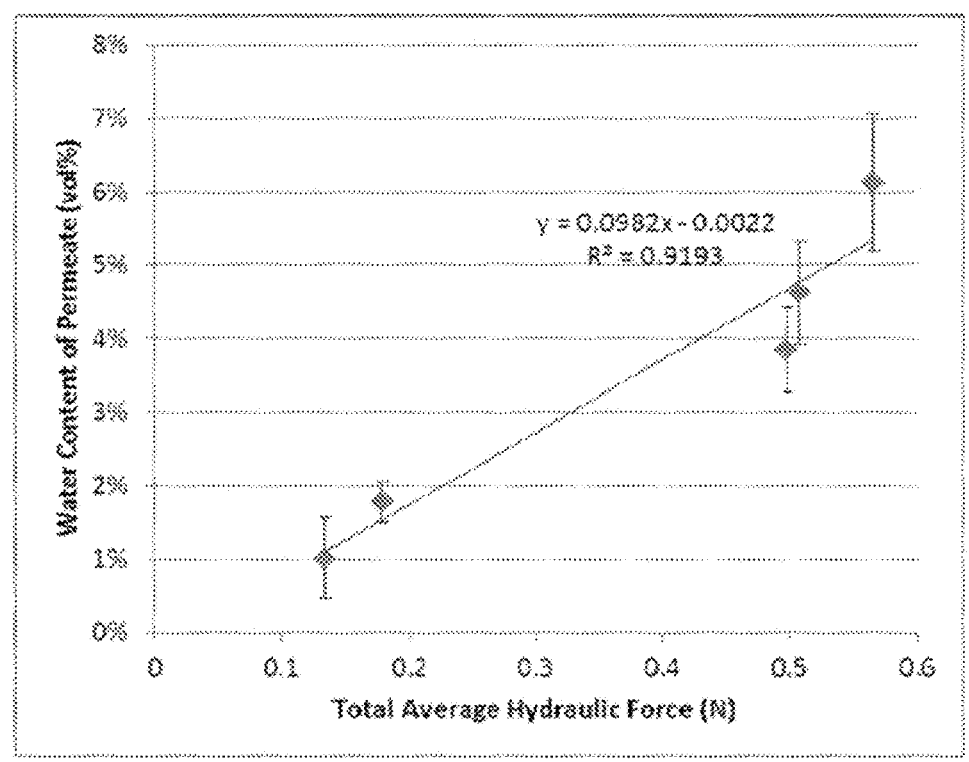
FIG. 26 is a graph showing relationship between water content and total hydraulic force for a 90 µm mesh on a 6 cm cylinder.

FIG. 26 shows a possible linear relationship between waves forces and water content. This could be due to the increased emulsification at higher wave frequencies (generally correlated with higher wave forces), whereby more entrained water droplets were forces through. It could also be due to a constant leak of water in the mesh. Higher forces would cause the leak to increase flow. Water leaking through small, hydrophobic pores is poorly understood. However, even under relevant wave conditions, the water content never rose above 10%.

6. Conclusions

A hydrophobic, polyethylene-coated stainless steel mesh was fabricated in large areas and affixed to a mid-scale prototype oil recovery device. By placing this device in a wave tank with a 0.5 cm thick layer of diesel fuel (oil) the effects of waves on such meshes was explored. Initial results show no clear relationship between wave forces and oil flux. However, the flux never decreased, only occasionally increased. Water content was shown to increase with increased wave forces, but never rose above 10% in the effluent. In addition, the observed oil flux was very high. The highest value of 10 L/m$^2$/s may be larger than any previously reported separation flux. Future efforts will involve varying the mesh geometry (pore size and wire thickness), coating morphology, and the size of the device (which affects wave forces). These tests strive to improve the understanding of the physical and chemical forces controlling hydrophobic mesh technology, while simultaneously developing a practical device for oil spill cleanup.

Other embodiments are within the scope of the following claims.

What is claimed is:

1. A liquid separating device comprising
a porous element having a coating including a hydrophobic polymer including a non-fluorinated polyolefin,
wherein the non-fluorinated polyolefin includes a polyethylene, the porous element having a mean pore size of 2 μm-142 μm when uncoated, and
when coated, has a water contact angle greater than about 100° and less than about 150°,
the coating being globular and having both microscale structures that provide a microscale roughness and nanoscale structures that provide a nanoscale roughness and
the porous element having a breakthrough depth of at least 10 cm, such that water pressure on a water-facing side of the porous element does not exceed the hydrophobic forces opposing passage of water through the element, and
the porous element includes a mesh configured to separate oil from water in situ via capillary action.

2. The liquid separating device of claim 1, wherein the porous element includes a hydrophobic and oleophilic mesh.

3. The liquid separating device of claim 2, wherein the mesh is a metallic mesh.

4. The liquid separating device of claim 3, wherein the metallic mesh is a stainless steel mesh.

5. A liquid separating device comprising:
an oil recovery chamber having an inlet including a porous element having a coating including a hydrophobic polymer including a non-fluorinated polyolefin, wherein the non-fluorinated polyolefin includes a polyethylene,
the porous element having globular irregular microstructures that provide a microscale roughness and nanostructures that provide nanoscale roughness
wherein the porous element having a mean pore size of 2 μm-142 μm when uncoated, and when coated, has a water contact angle greater than about 100° and less than about 150° and a breakthrough depth of at least 10 cm; and
an outlet configured to remove oil from the oil recovery chamber, the porous element including a hydrophobic and oleophilic mesh configured to separate oil from water in situ via capillary action.

6. The liquid separating device of claim 1, wherein the porous element, when coated, has a surface roughness higher than the porous element when uncoated.

* * * * *